(12) United States Patent
Chen et al.

(10) Patent No.: US 11,709,667 B2
(45) Date of Patent: Jul. 25, 2023

(54) NON-DISRUPTIVE FIRMWARE UPGRADE OF SYMMETRIC HARDWARE ACCELERATOR SYSTEMS

(71) Applicant: EMC IP Holding Company LLC, Hopkinton, MA (US)

(72) Inventors: Tao Chen, Beijing (CN); Yong Zou, San Jose, CA (US); Ran Liu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 87 days.

(21) Appl. No.: 17/347,141

(22) Filed: Jun. 14, 2021

(65) Prior Publication Data

US 2022/0398084 A1    Dec. 15, 2022

(51) Int. Cl.
*G06F 8/65* (2018.01)
*G06F 9/50* (2006.01)

(52) U.S. Cl.
CPC .............. *G06F 8/65* (2013.01); *G06F 9/5083* (2013.01); *G06F 2209/509* (2013.01)

(58) Field of Classification Search
CPC ..... G06F 8/65; G06F 9/5083; G06F 2209/509
See application file for complete search history.

(56) References Cited

U.S. PATENT DOCUMENTS

| | | | |
|---|---|---|---|
| 2013/0160016 A1* | 6/2013 | Gummaraju | G06F 9/5044 718/102 |
| 2014/0189673 A1 | 7/2014 | Stenfort | |
| 2015/0103837 A1* | 4/2015 | Dutta | H04L 47/125 370/401 |
| 2016/0019050 A1* | 1/2016 | Marr | G06F 8/65 717/172 |
| 2017/0123780 A1* | 5/2017 | Albot | G06F 8/654 |
| 2017/0286157 A1* | 10/2017 | Hasting | G06F 9/5038 |
| 2017/0293484 A1 | 10/2017 | Haase | |
| 2019/0004910 A1* | 1/2019 | Guim Bernat | G06F 21/44 |
| 2020/0257518 A1 | 8/2020 | Liedtke | |
| 2021/0191867 A1* | 6/2021 | Lengacher | G06F 12/0842 |
| 2021/0311799 A1* | 10/2021 | Porterfield | G06N 20/00 |
| 2021/0357202 A1 | 11/2021 | Swirydczuk | |

OTHER PUBLICATIONS

Makowski et al., "Firmware Upgrade in xTCA Systems" (Year: 2013).

* cited by examiner

*Primary Examiner* — Daxin Wu
(74) *Attorney, Agent, or Firm* — Staniford Tomita LLP

(57) ABSTRACT

In a symmetric hardware accelerator system, an initial hardware accelerator is selected for an upgrade of firmware. The initial and other hardware accelerators handle workloads that have been balanced across the hardware accelerators. Workloads are rebalanced by directing workloads having low CPU utilization to the initial hardware accelerator. A CPU fallback is conducted of the workloads of the initial hardware accelerator to the CPU. While the CPU is handling the workloads, firmware of the initial hardware accelerator is upgraded.

17 Claims, 16 Drawing Sheets

NON-DISRUPTIVE FIRMWARE UPGRADE OF SYMMETRIC HARDWARE ACCELERATOR SYSTEMS

CROSS-REFERENCE TO RELATED APPLICATIONS

This application is related to co-pending U.S. patent application Ser. No. 17/347,232, filed Jun. 14, 2021, and which is incorporated herein by reference for all purposes.

TECHNICAL FIELD

The present invention relates generally to information processing systems, and more particularly to upgrading firmware of a hardware accelerator system.

BACKGROUND

Hardware accelerators, such as Intel QuickAssist Technology (QAT) devices, are hardware components designed to perform specific tasks such as cryptographic calculations or other specific operations more efficiently than a central processing unit (CPU). Offloading such tasks from the CPU to the hardware accelerators can improve the overall efficiency of a computing platform as compared to having the CPU process all the tasks.

Periodically, however, it becomes necessary to upgrade firmware on the hardware accelerators. Upgrading firmware of a hardware accelerator can have an impact on the overall performance of a computing platform because the hardware accelerator will be unavailable to process tasks during the upgrade process. Client users or applications that depend on services provided by the computing platform may experience delays, latencies, disruptions, and an overall degradation in performance.

Therefore, there is a need for improved systems and techniques to upgrade firmware of a hardware accelerator system.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
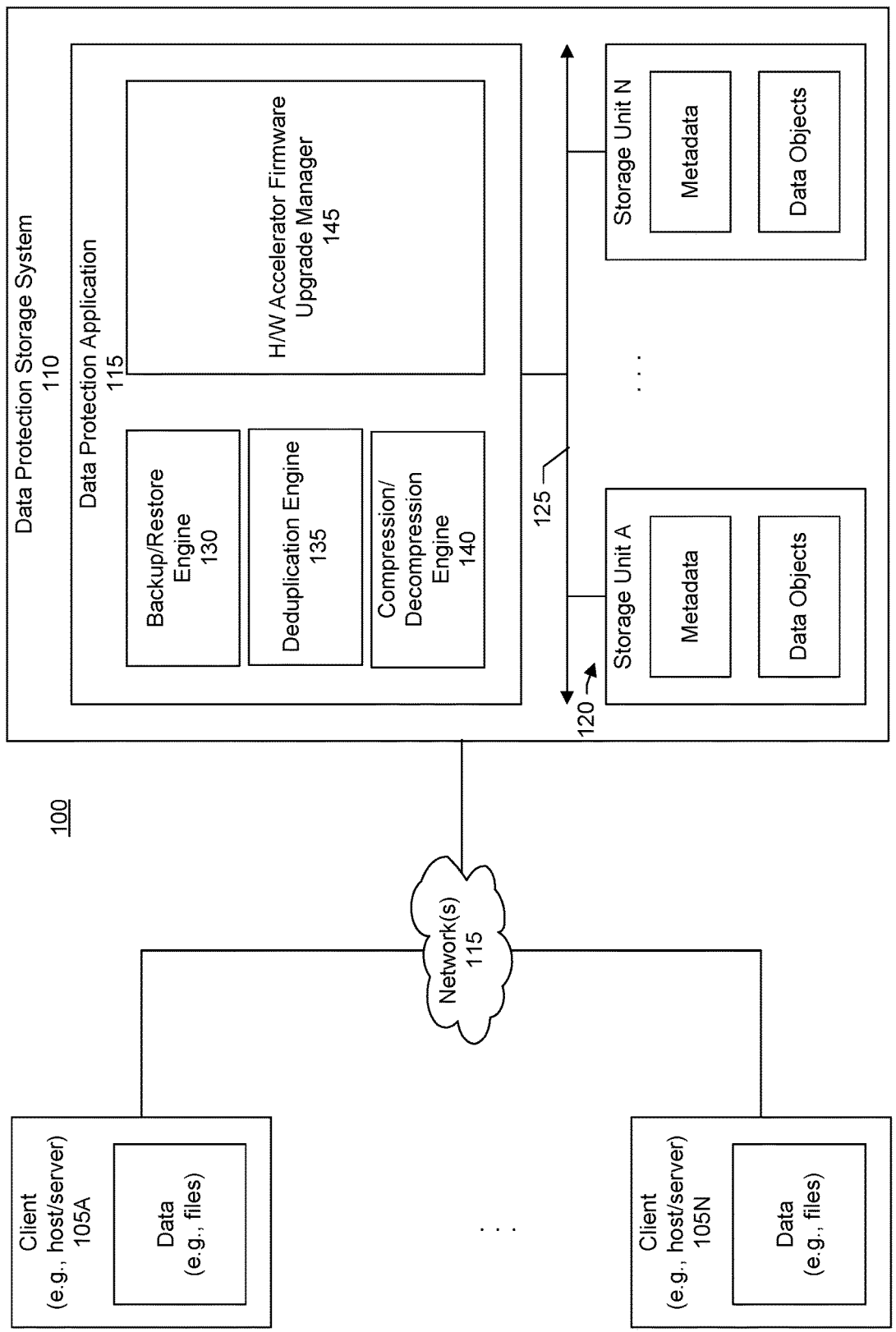
FIG. 1 shows a block diagram of an information processing system for conducting an adaptive non-disruptive firmware upgrade of hardware accelerators, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two.

Disclosed herein are methods and systems for conducting an adaptive non-disruptive firmware upgrade for hardware accelerators. FIG. 1 shows a block diagram of an information processing system 100 within which methods and systems for upgrading firmware of hardware accelerators may be implemented according to one or more embodiments. In the example shown in FIG. 1, there are a set of clients 105A-N, a data protection storage system 110, and a network 115 connecting the clients and data protection storage system. In an embodiment, the data protection system is a purpose-built backup appliance.

The network provides a mechanism for allowing the various components of the information processing system to communicate with each other. The network may itself be comprised of many interconnected computer systems and communication links. Communication links may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, the network is the Internet, in other embodiments, the network may be any suitable communication network including a local area network (LAN), a wide area network (WAN), a wireless network, an intranet, a private network, a public network, a switched network, and combinations of these, and the like.

The clients may be any type of computing device. Examples of computing devices include personal computers (e.g., desktops, laptops, tablets, smartphones, mobile phones, smartwatches, or wearable devices), servers, Web-enabled devices, or Internet of Things (IoT) devices and appliances. The clients generate data, files, or other data objects that may be referred to as primary data.

The data protection storage system represents any type of server or cluster of servers. The storage system may provide multiple users or client systems with access to shared data. Instead or additionally, the data protection storage system may provide backup (and restoration) services. For example, to protect against data loss, an organization may backup the files from the clients to the data protection storage system. The data protection storage system may thus provide a secondary storage system for the organization's data. An example of a data protection storage system includes Data Domain as provided by Dell EMC of Hopkinton, Mass.

In an embodiment, the data protection storage system is an on-premises backup storage system of the organization. For example, backups may be stored in network attached storage of the organization. A client may include a client backup module that communicates with the storage system to backup client data (e.g., files) to the storage system. The storage system can store the received data (e.g., files) as secondary or backup copies. These secondary or backup copies may be stored in a format different from their native source format. For example, secondary or backup copies may be stored in compressed and deduplicated format. If the primary copies at the clients become lost, such as via accidental deletion, or client hardware failure, the files can be recovered from the data protection storage system. In some cases, the data protection storage system may direct a migration of backed up data from a server of the data protection storage system to cloud storage. Moving backups to cloud storage can lower overall storage costs based on economies of scale that may be available with cloud storage.

The data protection storage system provides storage services to clients or users via a variety of access interfaces or protocols such as file-based access protocols and block-based access protocols. The file-based access protocols may include the network file system (NFS) protocol, common Internet file system (CIFS) protocol, and direct access file system protocol, and others. The block-based access protocols may include the small computer system interface (SCSI) protocols, Internet SCSI or iSCSI, and Fibre channel (FC) protocol, and others. The storage system may further provide storage services via an object-based protocol and Hadoop distributed file system (HDFS) protocol. In another embodiment, the data protection storage system supports a backup protocol referred to as Data Domain® Boost (DD Boost). DD Boost provides for in-line deduplication during a backup operation that helps to reduce network traffic and conserve backup system resources.

In the example shown in FIG. 1, the data protection storage system includes a data protection application (e.g., server with data protection application) 115 and one or more backup storage units 120 connected to the data protection application via an interconnect 125. The interconnect may include a bus architecture, network, or any other connection scheme that can link the storage units to the data protection application. The data protection application includes several components including a backup/restore engine 130, deduplication engine 135, compression/decompression engine 140, and hardware accelerator firmware upgrade manager 145. It should be appreciated that the blocks shown in FIG. 1 may be functional and there can be many different hardware and software configurations to implement the functions described.

The backup/restore engine is responsible for communicating with the various clients to backup data from the clients to the data protection storage system (and recover the backup data to the clients upon request). In an embodiment, each client includes an agent that communicates with the data protection application of the storage system to coordinate the backup (and restore) of data. The deduplication engine is responsible for data deduplication to help reduce the amount of redundant data that is stored. The compression/decompression engine is responsible for compressing data prior to storage and decompressing data upon retrieval.

Processes such as compression and deduplication allow for conserving storage space at the storage system. In an embodiment, a file or other data object to be stored is segmented. Fingerprints or hashes are calculated for the segments. In an embodiment, the fingerprint calculation includes applying a Secure Hash Algorithm 1 (SHA1) cryptographic hash function. Other examples of cryptographic hash functions that may be applied include Secure Hash Algorithm 2 (SHA2), Secure Hash Algorithm 3 (SHA3), and others.

The fingerprints are compared against a fingerprint or deduplication index identifying segments already existing at the storage system. A matching fingerprint indicates that the corresponding data segment already exists at the storage system. In this case, rather than transmitting the segment from the client to storage system or otherwise storing the segment at the storage system, metadata including a reference to the segment can be created and maintained at the storage system. A non-matching fingerprint indicates that the corresponding segment does not exist at the storage system and therefore should be transmitted to the storage system for storage. A data segment to be stored may be compressed into a compression region which, in turn, may be stored in a container. Metadata such as tree data structures and other references or data structures may be generated to track the location of the segment, compression region, and container to enable a file to be reconstructed.

Thus, the process of writing and retrieving a file may include a number of tasks and operations including the generation and manipulation of metadata, fingerprint computations, namespace operations, fingerprint lookups, traverses of file trees, recording locations at which containers and segments are written, and so forth. In an embodiment, certain types workloads including cryptography functions (e.g., SHA1), compression operations, and decompression operations are offloaded by the data protection application from a CPU to a set of hardware accelerators of the data protection storage system. The offloading helps to improve the overall performance of storage services provided by the data protection storage system.

Figure 2:
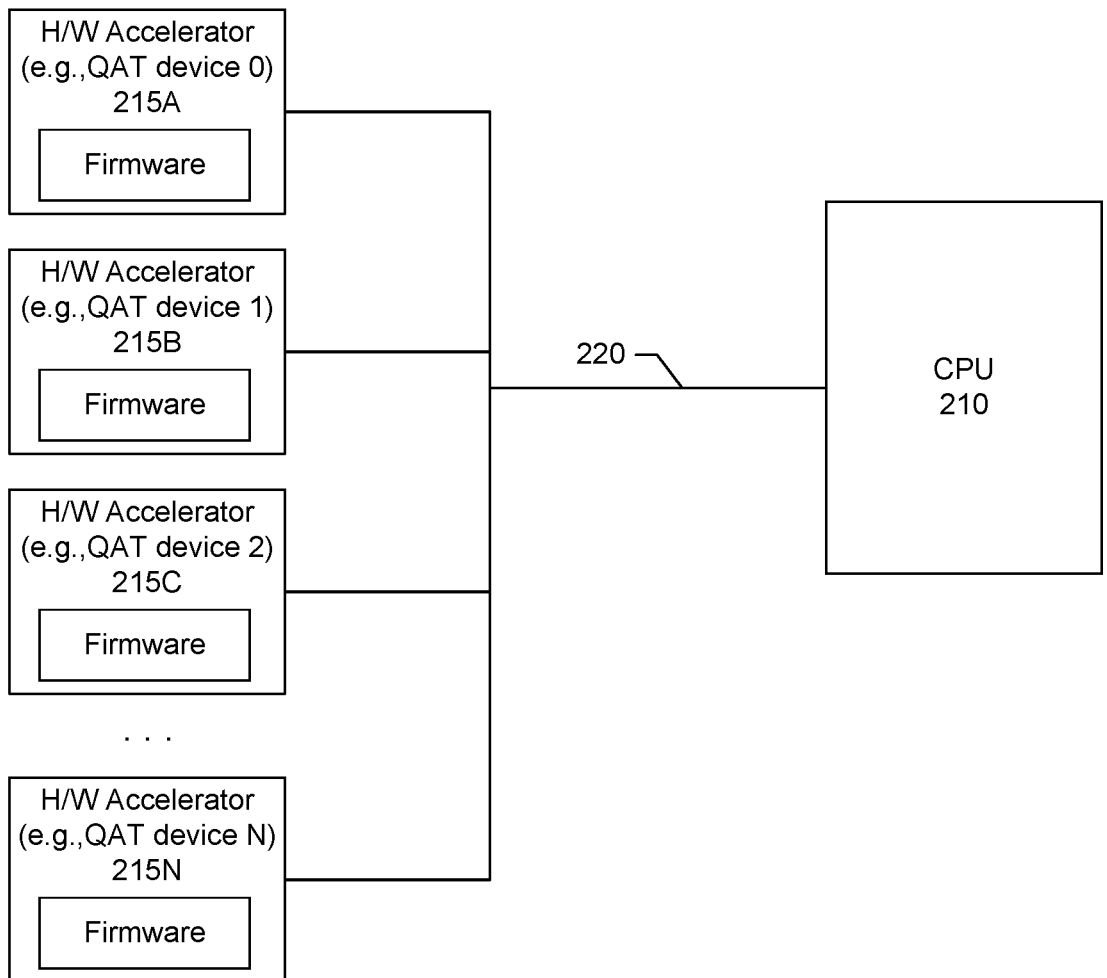
FIG. 2 shows a block diagram of a hardware accelerator system connected to a CPU, according to one or more embodiments.

More particularly, FIG. 2 shows a block diagram for an architecture of a data protection storage system, such as the data protection storage system shown in FIG. 1. As shown in the example of FIG. 2, the storage system includes a central processing unit (CPU) 210 and a set of hardware accelerators 215A-N that are connected to the CPU via a bus or interconnect 220. While only one CPU is shown, it should be appreciated that there can be multiple CPUs implemented as a multi-processor or multi-core processing system. There can be multiple or one or more hardware accelerator devices, e.g., 1, 2, 3, 4, 5, or more than five hardware accelerator devices.

Hardware accelerators are a type of device, card, or chip that can assist a CPU of a computer platform in processing certain workloads. In particular, compute-intensive operations and algorithms including security and compression operations, such as symmetric cryptography functions, asymmetric cryptography functions, and compression and decompression functions, can be offloaded from the CPU to one or more dedicated hardware accelerators. CPU cycles can then be used for other more critical tasks and workloads.

In an embodiment, the overall performance of a deduplication storage system is improved by offloading encryption, compression, and decompression workloads from the CPU to a set of hardware accelerators. Such hardware accelerators are specifically designed to perform certain functions more efficiently than a general purpose CPU. A deduplication storage system includes frequent workloads involving hash function computations, compression, and decompression. The use of hardware accelerators can thus provide a significant performance improvement in such a storage system. An example of a hardware accelerator is an Intel QuickAssist Technology™ (QAT) hardware accelerator device as provided by Intel® Corporation of Santa Clara, Calif. Some embodiments are described in conjunction with the QAT hardware accelerator device. It should be appreciated, however, that aspects and principles of the systems and techniques described can be applied to other hardware accelerators or other QAT compatible hardware accelerators.

A hardware accelerator includes firmware to control the functions of the device, much like a computer's operating system (OS) controls the function of software applications. Firmware is a specific class of computer software, programs, or instructions that provides the low-level control for a device's specific hardware. Firmware is typically added by a manufacturer of the device and may be stored in non-volatile memory such as read-only memory (ROM), erasable programmable read-only memory (EPROM), electrically erasable programmable read-only memory (EEPROM), or flash memory. Periodically, a user may be required to upgrade or update firmware of the hardware accelerator. Some reasons for upgrading firmware include fixing bugs, adding features to the device, patching vulnerabilities, maintaining compatibility with other operating system updates, or enhancing compatibility with other hardware or software components.

In some cases, the user can check with the device manufacturer's website to download firmware updates and install them manually. In other cases, the device may regularly check for new firmware and automatically download and install manually. In either case, performing a firmware upgrade of a hardware accelerator can be disruptive because the hardware accelerator will not be available to handle workloads, such as cryptographic, compression, and decompression workloads, during the upgrade process. Hardware accelerator firmware upgrade manager 145 (FIG. 1) of the data protection application is responsible for efficiently managing the hardware accelerator firmware upgrade process to help reduce impact to storage system performance so that the storage system can continue providing responsive storage services throughout the firmware upgrade process.

Figure 3:
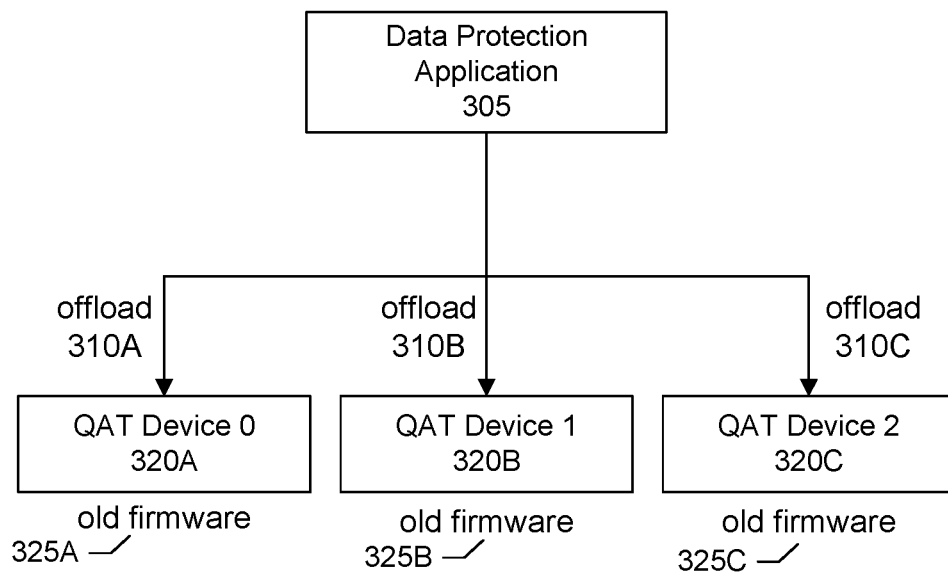
FIG. 3 shows a block diagram of a data protection application offloading workloads to a set of hardware accelerators, according to one or more embodiments.
Figure 4:
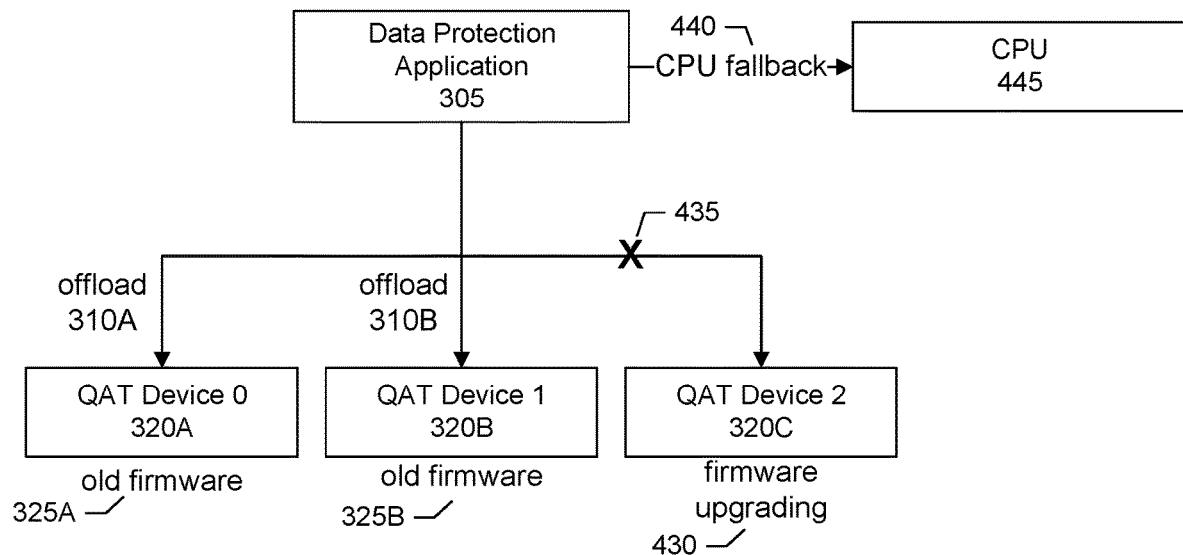
FIG. 4 shows a block diagram of a CPU fallback, according to one or more embodiments.
Figure 5:
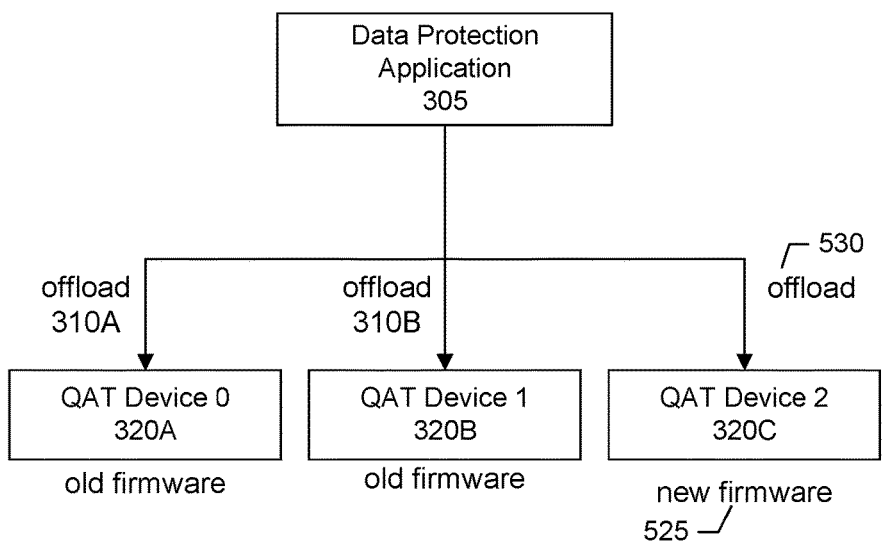
FIG. 5 shows a block diagram of firmware having been upgraded on a hardware accelerator, according to one or more embodiments.

FIGS. 3-5 show a process of hardware accelerator firmware upgrade with CPU fallback for a single device. CPU fallback refers to re-directing the affected hardware accelerator or QAT workloads to the CPU temporarily during the hardware accelerator (e.g., QAT device) firmware upgrade. FIG. 3 shows a first or initial state of a data protection storage system in which a data protection application 305 has offloaded 310A-C workloads to a set of hardware accelerators, e.g., QAT device 0 320A, QAT device 1 320B, and QAT device 2 320C. As shown in the example of FIG. 3, at the first or initial state, each hardware accelerator device includes an installation of old firmware 325A-C, respectively.

FIG. 4 shows a second state of the data protection storage system, after the first state. In the second state, firmware of QAT device 2 is being upgraded 430. An "X" 435 indicates that QAT device 2 is unavailable for offloading workloads during the upgrade process. Thus, a CPU fallback 440 is triggered in which workloads that were to be handled by QAT device 2 are instead redirected to CPU 445. QAT devices 0-1 (which still have old firmware 325A,B) continue to process their respective offloaded workloads while QAT device 2 is undergoing an upgrade of firmware.

FIG. 5 shows a third state of the data protection storage system, after the second state. In the third state, firmware of QAT device 2 has been upgraded to new firmware 525. Workloads can now be offloaded 530 back onto QAT device 2, now having the upgraded or new firmware. The firmware upgrade process, including the CPU fallback, can be repeated with each remaining QAT device (e.g., QAT device 0 and QAT device 1) until the firmware of all QAT devices have been upgraded to new firmware.

The process to upgrade firmware shown in FIGS. 3-5 allows the storage system to continue functioning during the upgrade process, but at a reduced level of performance. The reduced level of performance may be observed, for example, in increased latencies when responding to client requests to, for example, write, access, or retrieve files and other data objects. The upgrade process is not optimal for the CPU. The reason is because different types of hardware accelerator (e.g., QAT) workloads consume different levels of CPU utilization. That is, certain types of workloads require more CPU time as compared to other types of workloads. For example, when using CPU fallback, compression will demand more CPU utilization than decompression and decompression will demand more CPU utilization than hash generation (e.g., SHA1). In other words, compression workloads require more CPU cycles than decompression and hash computation workloads. So, without an adaptive strategy, those QAT workloads that are less CPU cost-effective (e.g., compression) may fall back onto the CPU, thereby increasing the CPU burden. Workload CPU utilization may be measured as a function of one or more of processing cycles, latency, or throughput.

Figure 6:
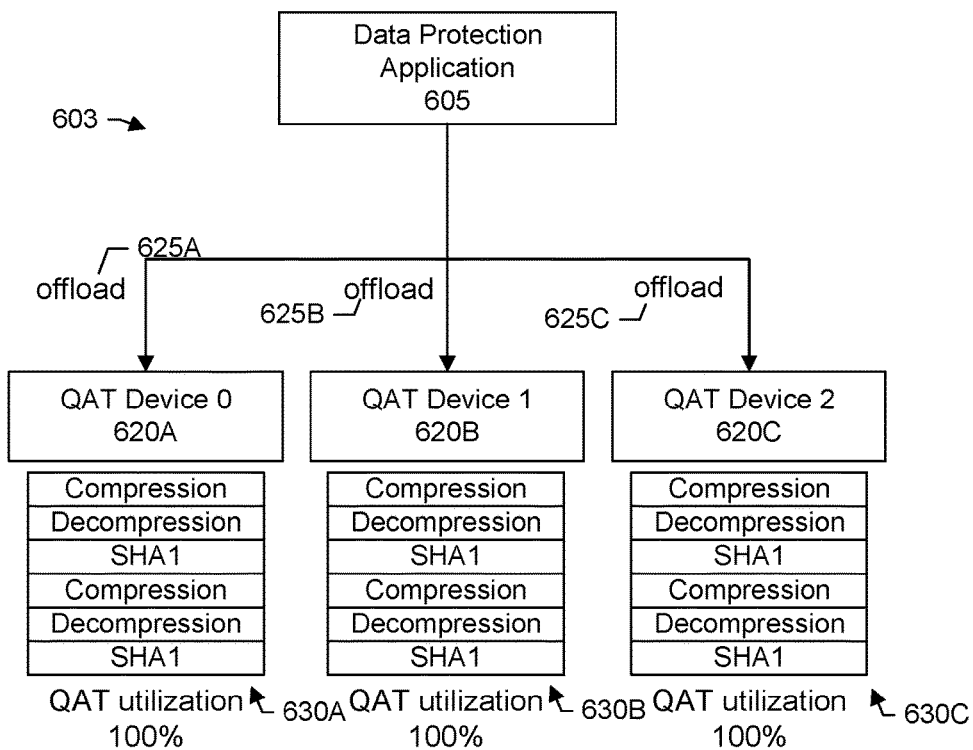
FIG. 6 shows an architecture of a symmetric hardware accelerator system, according to one or more embodiments.

More particularly, FIG. 6 shows an architecture of a symmetric hardware accelerator system 603. In an embodiment, the symmetric hardware accelerator system may be referred to as a symmetric QAT system. The example shown in FIG. 6 includes a data protection application 605 and hardware accelerators, e.g., QAT device 0 620A, QAT device 1 620B, and QAT device 2 620C, connected to the data protection application. The data protection application has offloaded 625A-C workloads to each QAT device for handling or processing. Specifically, QAT device 0 is handling a set of workloads 630A. QAT device 1 is handling a set of workloads 630B. QAT device 2 is handling a set of workloads 630C.

In a symmetric QAT system, QAT workloads are balanced across all QAT devices. Having balanced workloads can improve application responsiveness because no single device will bear a disproportionate level of demand. As shown in the example of FIG. 6, in the symmetric QAT system, each QAT device or hardware accelerator is configured to handle multiple types (e.g., two or more types) of workloads. For example, the types of workloads being handled by each of QAT devices 0, 1, and 2 include compression, decompression, and hash generation (e.g., SHA1). Any competent load balancing technique may be used to balance the workloads across the QAT devices.

For example, round robin load balancing may be used to distribute the workloads across the QAT devices. In particular, a workload request may be forwarded to each QAT device in turn or on a cyclical basis. That is, a first workload, regardless of type, may be routed to QAT device 0. A second workload, regardless of type, may be routed to QAT device 1. A third workload, regardless of type, may be routed to QAT device 2. Workload requests may continue being passed to the QAT devices according to this order. That is, a fourth workload, regardless of type, may be routed to QAT device 0. A fifth workload, regardless of type, may be routed to QAT device 1, and so forth. Other examples of workload balancing techniques that may be adapted for use include weighted round robin, least connection, resource based adaptive, and others.

Figure 7:
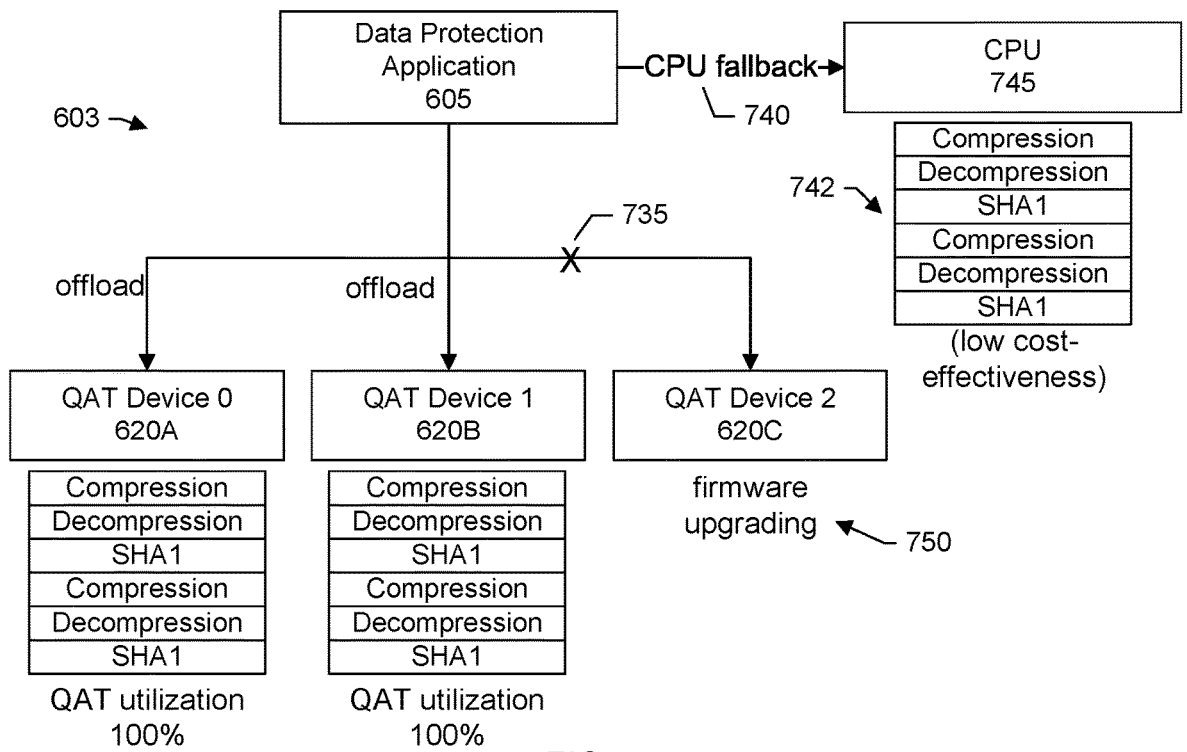
FIG. 7 shows a block diagram of upgrading firmware of a hardware accelerator system, according to one or more embodiments.

Upgrading any hardware accelerator device will put a mix of workloads on the CPU, as shown in the example of FIG. 7. In FIG. 7, firmware is being upgraded on QAT device 2 620C. An "X" 735 indicates that QAT device 2 is unavailable during the upgrade process. As a result, a CPU fallback 740 has been triggered to redirect workloads 742 intended for QAT device 2 to a CPU 745 while firmware on QAT device 2 is being upgraded 750. However, the redirection of the workloads to the CPU has a low-cost effectiveness because different types of workloads have different levels of CPU utilization.

In particular, there are workloads a first type including hash computation workloads (e.g., SHA1), workloads of a second type including decompression workloads, and workloads of a third type including compression workloads. Workloads of the first type (hash computation workloads (e.g., SHA1)) are less demanding of CPU utilization as compared to workloads of the second and third types, e.g., compression and decompression workloads, respectively. Workloads of the second type (e.g., decompression workloads) are less demanding of CPU utilization as compared to workloads of the third type (e.g., compression workloads).

In an embodiment, to minimize or mitigate the increase in CPU burden, a hardware accelerator or QAT firmware upgrade strategy takes CPU fallback cost-effectiveness into consideration. In an embodiment, to minimize or mitigate the impact on CPU, a QAT non-disruptive firmware upgrade technique takes the CPU cost-effectiveness of QAT workloads into consideration. In an embodiment, QAT workload rebalance is performed for symmetric QAT systems and QAT device re-configuration is performed for asymmetric QAT systems to minimize or mitigate CPU utilization impact.

Figure 8:
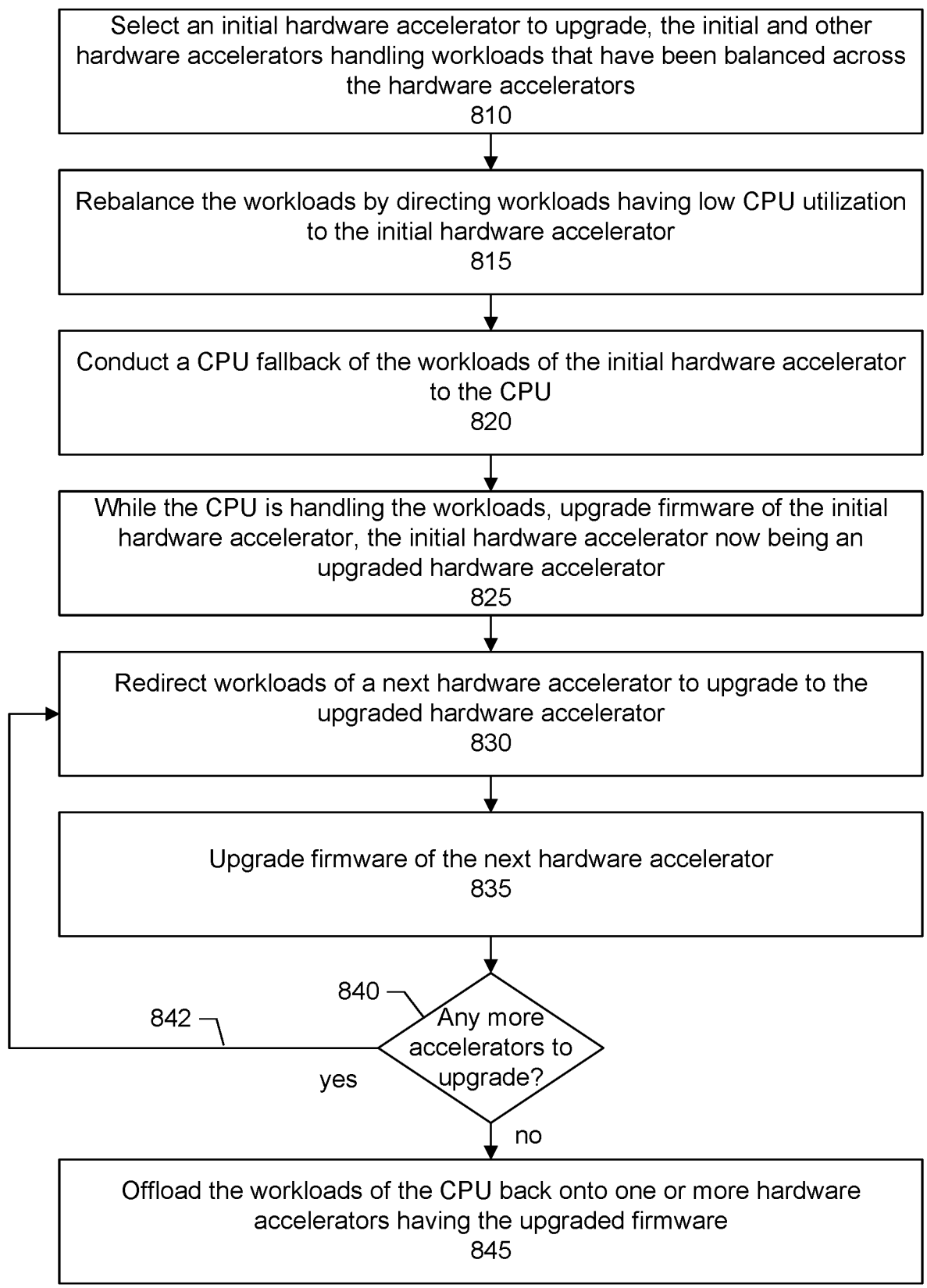
FIG. 8 shows an overall flow of a process for upgrading firmware of a symmetric hardware accelerator system, according to one or more embodiments.

More particularly, FIG. 8 shows an overall flow of a process for conducting a firmware upgrade of a symmetric hardware accelerator system according to one or more embodiments. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In an embodiment, a QAT workload rebalance includes rebalancing QAT workloads across devices based on their CPU cost-effectiveness. The objective is to make CPU cost-effective workloads be concentrated on a single QAT device as much as possible. For example, in a scenario involving hash computation workloads (e.g., SHA1), decompression workloads, and compression workloads, the most cost-effective workload is the hash computation or SHA1 workload and is thus concentrated on a particular QAT device, e.g. "QAT device 0". "QAT device 0" is then upgraded by relying on CPU fallback. This process is then repeated for other devices until all are upgraded.

More specifically, in a step 810, an initial hardware accelerator is selected for a firmware upgrade, the initial and other hardware accelerators handling workloads that have been balanced across the hardware accelerators. FIG. 6 shows an example of a first or initial state of the hardware accelerator system. The example shown in FIG. 6 is of a perfect balanced system in which each hardware accelerator of a set of hardware accelerators handles or processes an equal or substantially equal number of workloads of different types or is otherwise loaded with about the same or substantially same amount of work as each other hardware accelerator. That is, no hardware accelerator is being loaded disproportionally in comparison with the other hardware accelerators. In the example shown in FIG. 6, QAT device 0 is shown as processing two compression workloads, two decompression workloads, and two hash computation (e.g., SHA1) workloads. QAT device 1 is shown as processing two compression workloads, two decompression workloads, and two hash computation (e.g., SHA1) workloads. QAT device 2 is shown as processing two compression workloads, two decompression workloads, and two hash computation (e.g., SHA1) workloads.

Consider, as an example, that QAT device 0 is selected as the initial hardware accelerator for the firmware upgrade. The selection of the initial or a particular hardware accelerator to upgrade first may be arbitrary.

Figure 9:
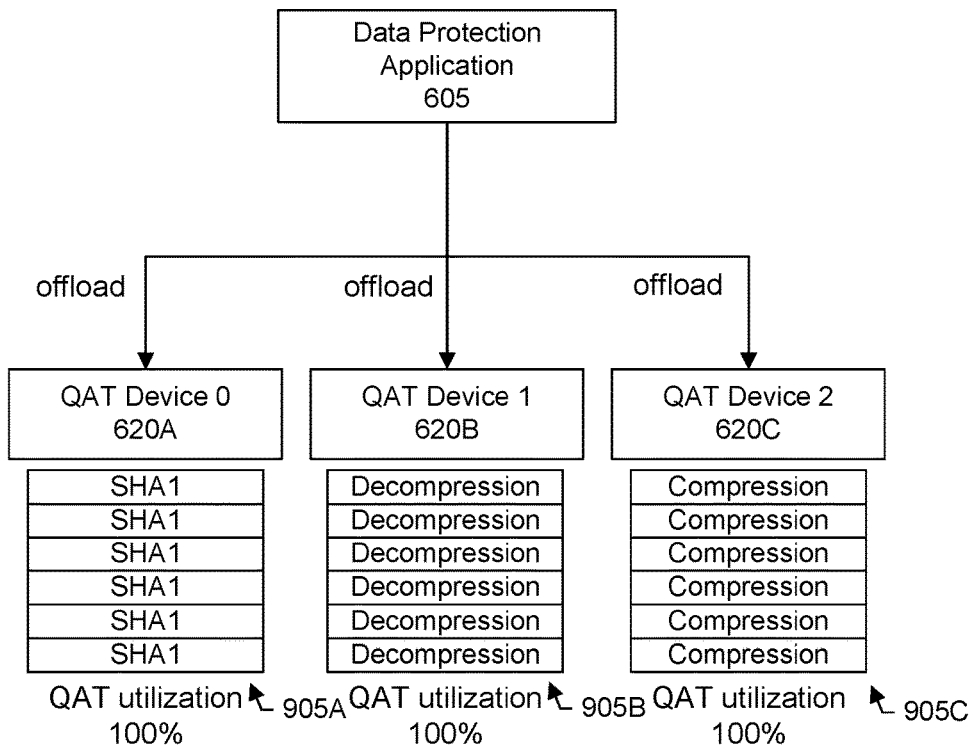
FIG. 9 shows a state of a hardware accelerator system after rebalancing, according to one or more embodiments.

In a step 815, the workloads are rebalanced by directing workloads having low CPU utilization to the initial hardware accelerator, while workloads having high CPU utilization are directed to one or more of the other hardware accelerators. This results in an unbalanced state where the selected hardware accelerator is loaded less as compared to the other hardware accelerators. FIG. 9 shows a second state, after the first state, of the hardware accelerator system shown in FIG. 6 after the rebalancing. As shown in the example of FIG. 9, workloads of the first type including hash computation workloads (e.g., SHA1) 905A, which have the lowest CPU utilization as compared to the workloads of the second and third types (e.g., decompression and compression, respectively) have been directed to QAT device 0.

Workloads of the other types having higher CPU utilization than the workloads of the first type have been directed to the other QAT devices 1 and 2. In an embodiment, the workloads are directed or rebalanced across the QAT devices such that each QAT device handles or processes a single type of workload. For example, in FIG. 9, QAT device 1 is shown as handling or processing decompression type workloads 905B. QAT device 2 is shown as handling or processing compression type workloads 905C. It should be appreciated, however, that this is not necessarily always the case. In other embodiments, the other hardware accelerators or QAT devices of a symmetric hardware accelerator system may handle multiple (e.g., two or more) types of workloads after a rebalancing.

Referring back now to FIG. 8, in a step 820, a CPU fallback is conducted of the workloads of the initial hardware accelerator to the CPU. In a step 825, while the CPU is handling the workloads, an upgrade of firmware of the initial hardware accelerator is performed. Upon completion of the upgrade, the initial hardware accelerator may be referred to as an upgraded hardware accelerator.

Figure 10:
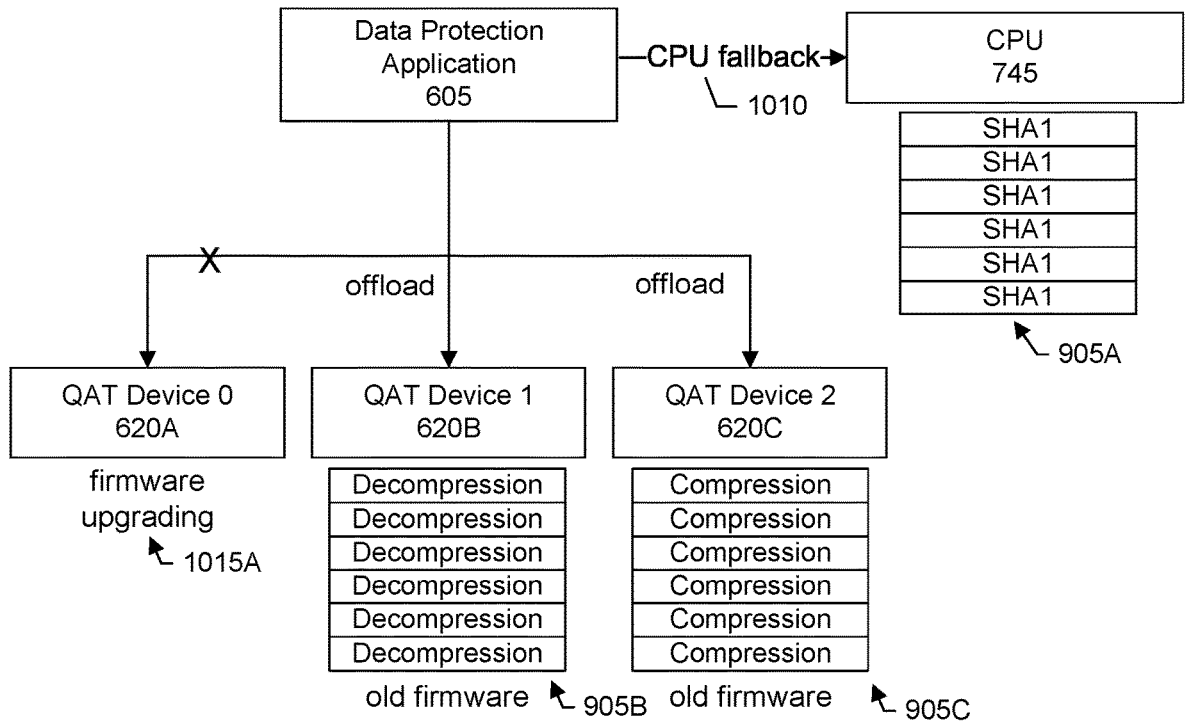
FIG. 10 shows a CPU fallback being conducted to upgrade firmware of a hardware accelerator, according to one or more embodiments.

For example, FIG. 10 shows a third state, after the second state, of the hardware accelerator system shown in FIG. 6, illustrating a CPU fallback 1010 having been triggered (step 820) and a firmware upgrade 1015A of the initial hardware accelerator (QAT device 0) while the CPU is handling or processing the workloads of the initial hardware accelerator (step 825). In particular, the CPU is handling the first type of workload (e.g., hash computation, SHA1) having the lowest CPU utilization as compared to the workloads of the other types being handled by the other hardware accelerators, e.g., decompression and compression workloads 905B, C.

Referring back now to FIG. 8, upon completion of the upgrade, the hardware accelerator may be restarted and may now be referred to as an upgraded hardware accelerator. In a step 830, workloads of a next hardware accelerator to upgrade are redirected to the upgraded hardware accelerator. In a step 835, firmware of the next hardware accelerator is upgraded. The firmware upgrade of the next hardware accelerator may be triggered when, for example, the next hardware accelerator has completed all pending workloads or otherwise reports a 0 percent utilization based on the workloads having been redirected to the upgraded hardware accelerator (step 830).

Figure 11:
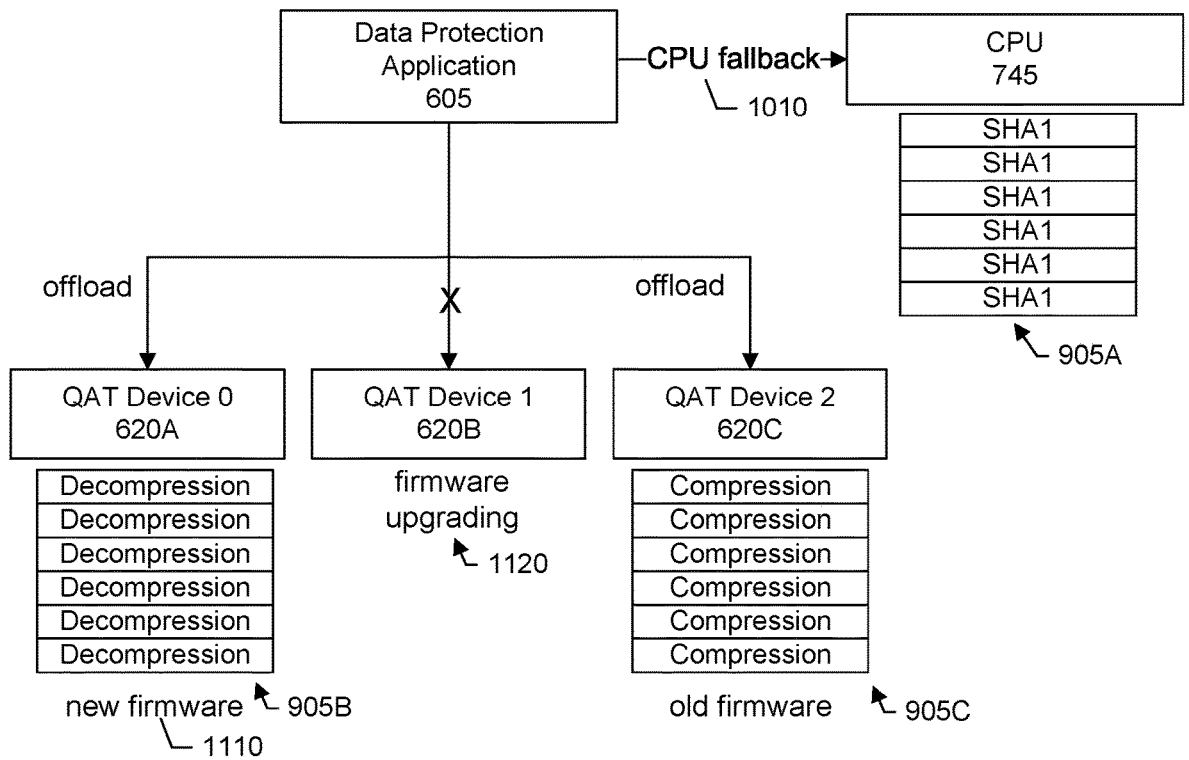
FIG. 11 shows another hardware accelerator being upgraded, according to one or more embodiments.

FIG. 11 shows a fourth state, after the third state, of the hardware accelerator system shown in FIG. 6. As shown in the example of FIG. 11, QAT device 0 has been upgraded with new firmware 1110. QAT device 1 has been identified as the next hardware accelerator to upgrade. Thus, workloads 905B of QAT device 1 have been redirected to upgraded hardware accelerator QAT device 0 while firmware is being upgraded 1120 on QAT device 1. The CPU fallback is maintained with the CPU continuing to process low CPU utilization workloads 905A.

Referring back now to FIG. 8, in a step 840, a determination is made as to whether there are any more hardware accelerators to upgrade. If so, the redirecting of workloads from a hardware accelerator requiring upgrade to an upgraded hardware accelerator (step 830) and upgrade process (step 835) repeats 842.

Figure 12:
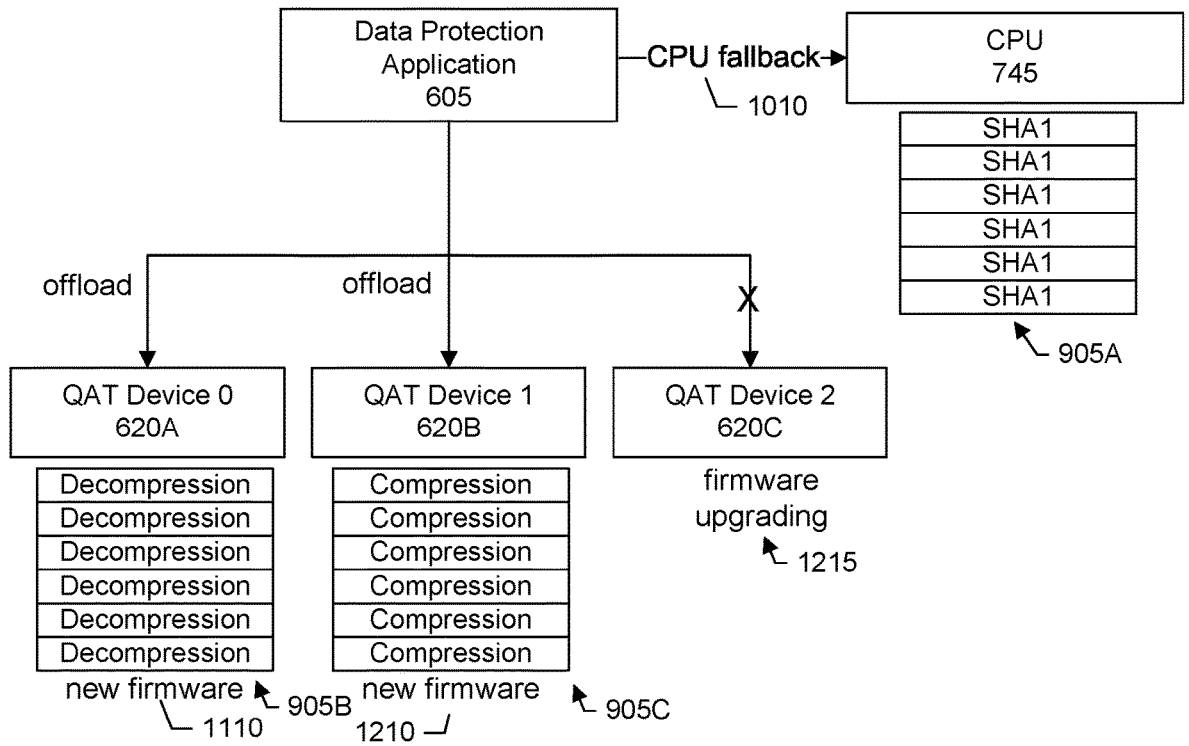
FIG. 12 shows another hardware accelerator being upgraded, according to one or more embodiments.

FIG. 12 shows a fifth state, after the fourth state, of the hardware accelerator system shown in FIG. 6. As shown in the example of FIG. 12, QAT device 1 has been upgraded with new firmware 1210. There remains other hardware accelerators to upgrade, e.g., QAT device 2. Thus, workloads 905C of QAT device 2 have been directed to an upgraded hardware accelerator (e.g., QAT device 1) while firmware is being upgraded 1215 on QAT device 2. The CPU fallback is maintained with the CPU continuing to process low CPU utilization workloads 905A.

Referring back now to FIG. 8, upon all hardware accelerators being upgraded, in a step 845, workloads of the CPU are offloaded back onto one or more hardware accelerators having the upgraded firmware.

Figure 13:
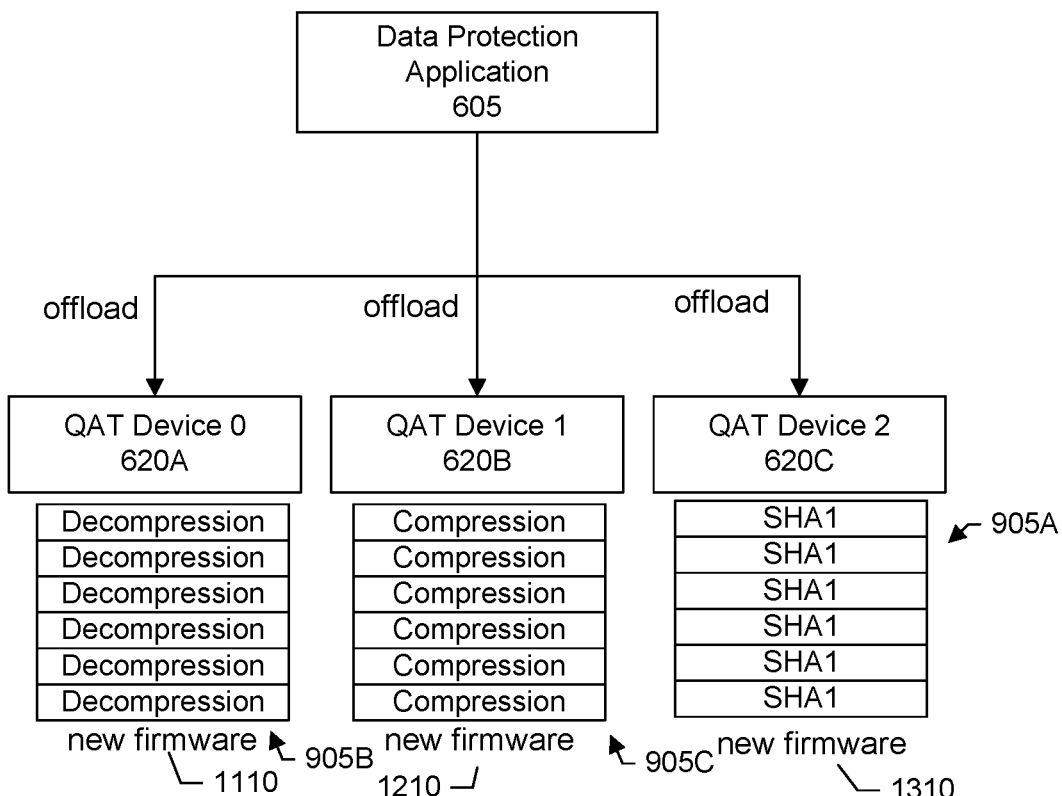
FIG. 13 shows an example of all hardware accelerators having been upgraded, according to one or more embodiments.

FIG. 13 shows a sixth state, after the fifth state, of the hardware accelerator system shown in FIG. 6. As shown in the example of FIG. 13, all hardware accelerators have been upgraded with new firmware and CPU fallback workloads 905A have been offloaded back onto a hardware accelerator having new firmware 1310 (e.g., QAT device 2). After the upgrade, each hardware accelerator may continue to process workloads of a single type. Alternatively, one or more hardware accelerators may process a mix of workloads of different types in order to balance loads across the hardware accelerators and avoid a scenario where a hardware accelerator is heavily loaded while another hardware accelerator remains idle or lightly loaded.

There can be an imperfect balanced system because of different requests to process different types of workloads. For example, when writing a large file to storage, there may be a greater number of hash computation and compression workloads as compared to decompression workloads. When reading or retrieving a large file from storage, there may be a greater number of decompression workloads as compared to compression workloads.

Figure 14:
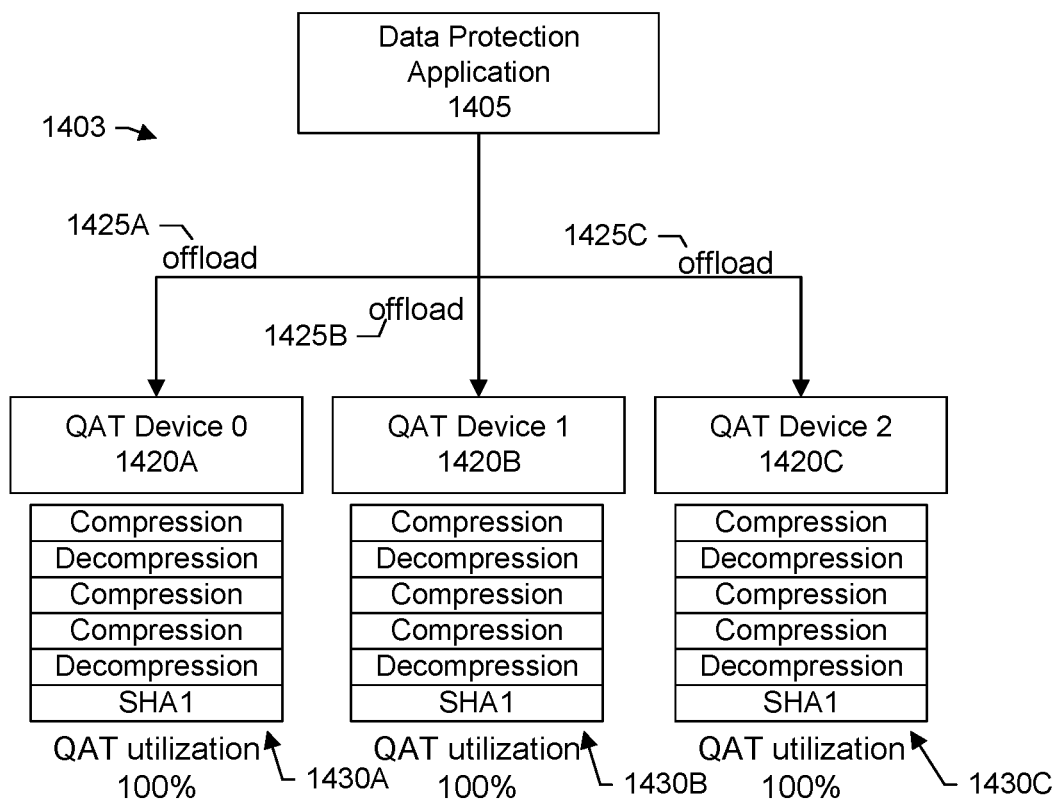
FIG. 14 shows an example of an imperfect balanced hardware accelerator system, according to one or more embodiments.

For example, FIG. 14 shows a first or initial state of an imperfect balanced symmetric hardware accelerator system 1403. There is a data protection application 1405 and hardware accelerators, e.g., QAT device 0 1420A, QAT device 1 1420B, and QAT device 2 1420C, connected to the data protection application. The data protection application has offloaded 1425A-C workloads to each QAT device for handling and processing. Specifically, QAT device 0 is handling a set of workloads 1430A. QAT device 1 is handling a set of workloads 1430B. QAT device 2 is handling a set of workloads 1430C.

In the imperfect balanced symmetric hardware accelerator system, a hardware accelerator may handle or process a different number of workloads of different types. For example, the number of hash computation (e.g., SHA1) workloads is less than the number of compression and decompression workloads. Specifically, QAT device 0 is shown as processing three compression workloads, two decompression workloads, and a single hash computation workload. QAT device 1 is shown as processing three compression workloads, two decompression workloads, and a single hash computation workload. QAT device 2 is shown as processing three compression workloads, two decompression workloads, and a single hash computation workload.

Figure 15:
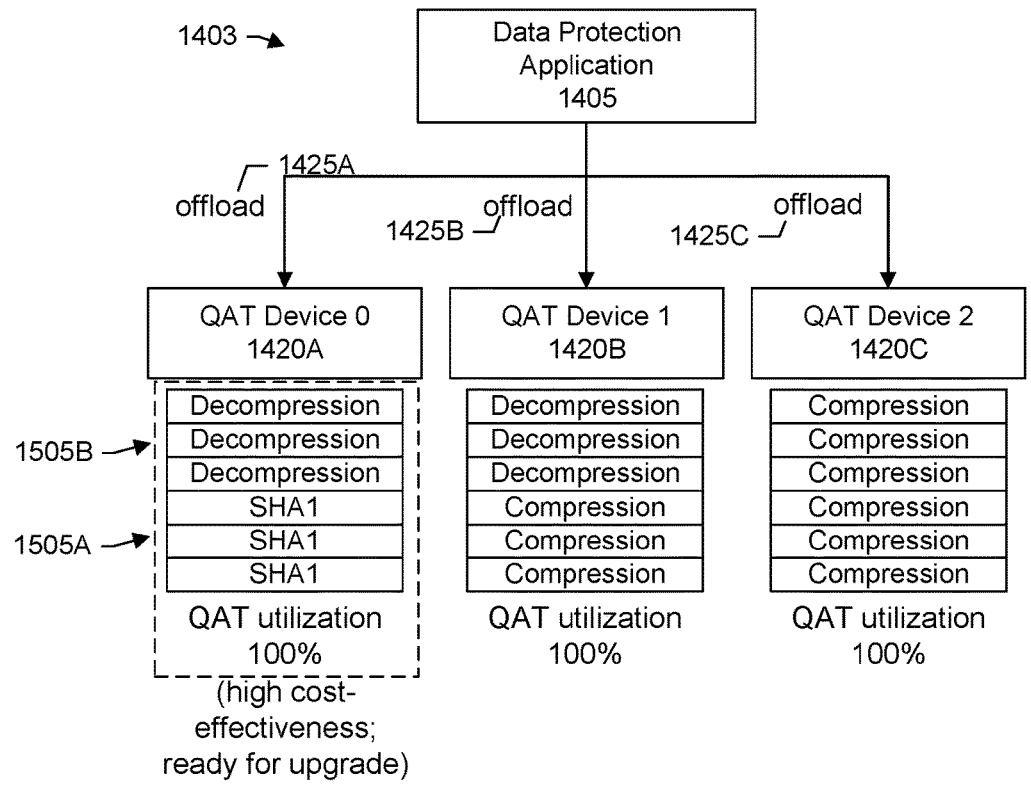
FIG. 15 shows an example of rebalancing an imperfect balanced hardware accelerator system, according to one or more embodiments.

Nonetheless, the process shown in FIG. 8 can still be applied to direct workloads having low CPU utilization to a particular initial hardware accelerator device to upgrade, see, e.g., step 815, FIG. 8. For example, FIG. 15 shows a second state, after the first state, of the hardware accelerator system shown in FIG. 14. FIG. 15 shows the state after the rebalance where most CPU cost effective workloads 1505A, e.g., SHA1, and second best workloads 1505B, e.g., decompression, are put on QAT device 0. QAT device 0 is upgraded using CPU fallback to redirect the workloads of QAT device 0 to the CPU. The process is then repeated for all other devices until all are upgraded.

In an embodiment, a set of incoming workloads are ranked, weighted, or scored according to their CPU utilization. Workloads requiring greater CPU utilization as compared to other workloads requiring less CPU utilization may be assigned higher weights than the other workloads requiring less CPU utilization.

Table A below shows an example of workload types having been weighted according to their CPU utilization.

TABLE A

| Workload Type | Weight |
|---|---|
| Compression | 3 |
| Decompression | 2 |
| Compression | 3 |
| Compression | 3 |
| Decompression | 2 |
| SHA1 | 1 |
| Compression | 3 |
| Decompression | 2 |
| Compression | 3 |
| Compression | 3 |
| Decompression | 2 |
| SHA1 | 1 |
| Compression | 3 |
| Decompression | 2 |
| Compression | 3 |
| Compression | 3 |
| Decompression | 2 |
| SHA1 | 1 |

In an embodiment, a rebalancing may include redirecting workloads to a set of hardware accelerators based on CPU utilization weights assigned to the workloads. The rebalancing or redirecting workloads may continue all workloads have been rebalanced or until all hardware accelerators have reached 100 percent utilization (see, e.g., FIG. 15). A hardware accelerator processing workloads having a lowest total weighting as compared to total workload weightings of workloads being processed by other hardware accelerators is then identified. The identified hardware accelerator is then selected as an initial hardware accelerator to upgrade. According to the sample data shown in table A above and the example of FIG. 15, QAT device 0 has a total weighted CPU utilization score of 9, QAT device 1 has a total weighted CPU utilization score of 15, and QAT device 2 has a total weighted CPU utilization score of 18. Thus, the initial firmware upgrade is conducted using QAT device 0.

In an embodiment, a method includes weighting working loads of different types according to CPU utilization; based on the weighting, directing one or more workloads of different types to an initial hardware accelerator to be upgraded while directing one or more other workloads of other different types to other hardware accelerators, the one or more workloads of the different types being directed to the initial hardware accelerator having lower CPU utilization as compared to the one or more other workloads of the other different types being directed to the other hardware accelerators; conducting a CPU fallback of the workloads of the initial hardware accelerator to the CPU; and while the CPU is processing the workloads of the initial hardware accelerator, upgrading firmware of the initial hardware accelerator.

It should be appreciated that the weighting convention may be reversed such that workloads having low CPU utilization are assigned higher weights as compared to workloads having high CPU utilization. In this case, the initial hardware accelerator to upgrade is the hardware accelerator having the highest total weighted score.

Figure 16:
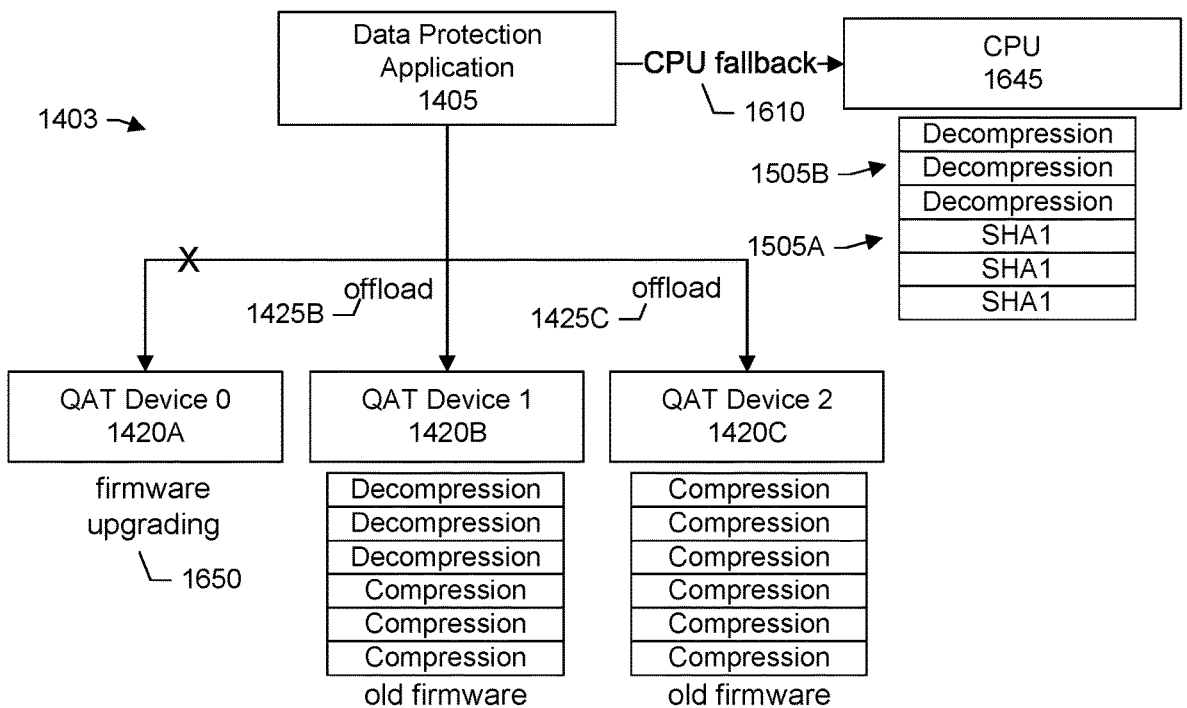
FIG. 16 shows an example of conducting a CPU fallback to upgrade a hardware accelerator of an imperfect balanced hardware accelerator system, according to one or more embodiments.

FIG. 16 shows a third state, after the second state, of the hardware accelerator system shown in FIG. 14. In FIG. 16, a CPU fallback 1610 has been triggered on QAT device 0 so that the low CPU utilization workloads of QAT device 0, e.g., hash computation (e.g., SHA1) workloads 1505A and decompression workloads 1505B, are redirected to a CPU 1645. While the CPU is handling the workloads, an upgrade of firmware of the initial hardware accelerator is performed 1650, see, e.g., step 825, FIG. 8. The remaining steps of the process shown in FIG. 8 are similarly executed to upgrade all hardware accelerators.

Figure 17:
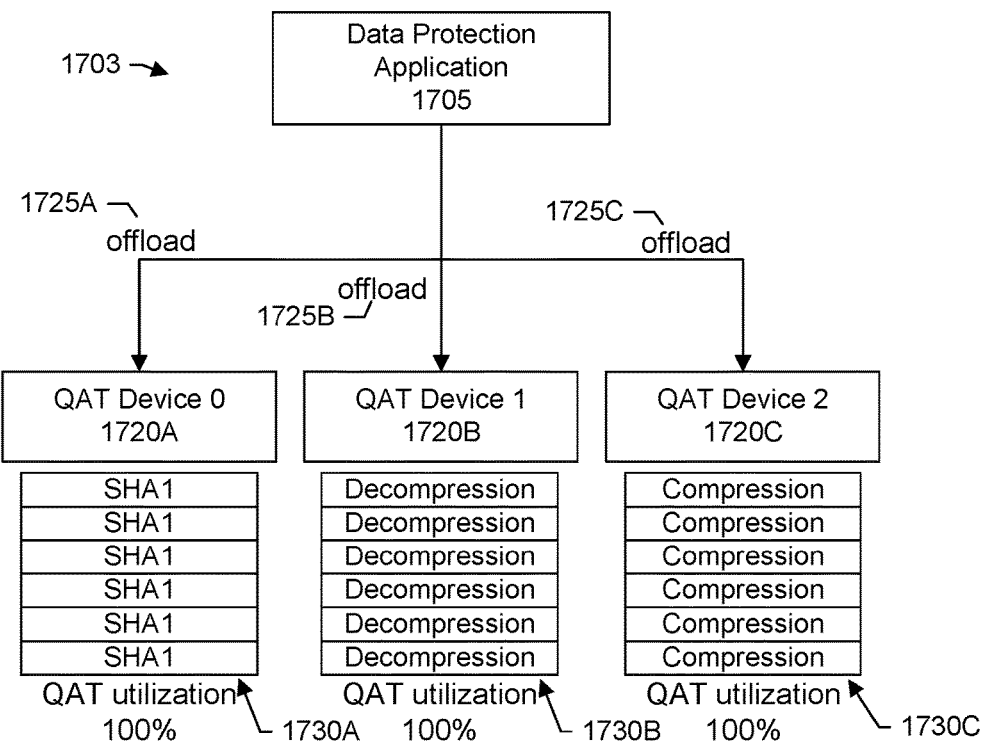
FIG. 17 shows an architecture of an asymmetric hardware accelerator system, according to one or more embodiments.

FIG. 17 shows an architecture of an asymmetric hardware accelerator system 1703. In an embodiment, the asymmetric hardware accelerator system may be referred to as a asymmetric QAT system. In an asymmetric hardware accelerator system, each hardware accelerator may be designed or configured for a particular type of workload. The example shown in FIG. 17 includes a data protection application 1705 and hardware accelerators, e.g., QAT device 0 1720A, QAT device 1 1720B, and QAT device 2 1720C, connected to the data protection application. The data protection application has offloaded 1725A-C workloads to each QAT device for handling or processing. Specifically, QAT device 0 is handling a set of workloads 1730A. QAT device 1 is handling a set of workloads 1730B. QAT device 2 is handling a set of workloads 1730C.

For an asymmetric QAT system, each QAT device provides a single type offloading service. In other words, in an asymmetric system, each QAT device is configured to process a single type of workload. In the example shown in FIG. 17, QAT device 0 is handling or processing workloads of a first type, e.g., hash computations (SHA1). QAT device 1 is handling or processing workloads of a second type, e.g., decompression. QAT device 2 is handling or processing workloads of a third type, e.g., compression. Having a single service on a single device can provide good performance due to less resource sharing overheads between services.

Figure 18:
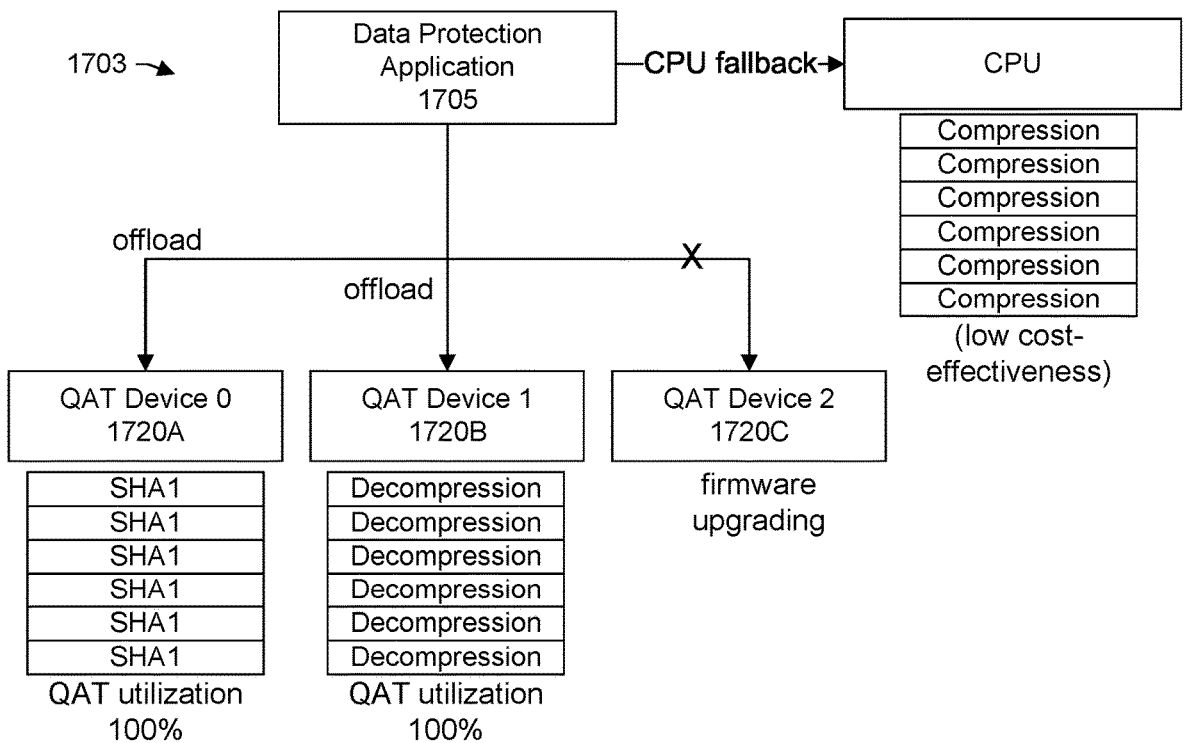
FIG. 18 shows an example of hardware accelerator upgrade of an asymmetric hardware accelerator system, according to one or more embodiments.

Decompression and compression workloads require higher CPU utilization as compared to hash computations. Selecting a QAT device other than QAT device 0 as an initial device to upgrade will result in a sub-optimal use of resources. For example, as shown in FIG. 18, upgrading QAT device 2 will create a heavier CPU burden as compared to upgrading other devices as compression is less cost-effective on CPU utilization as compared to, for example, hash computations.

Figure 19:
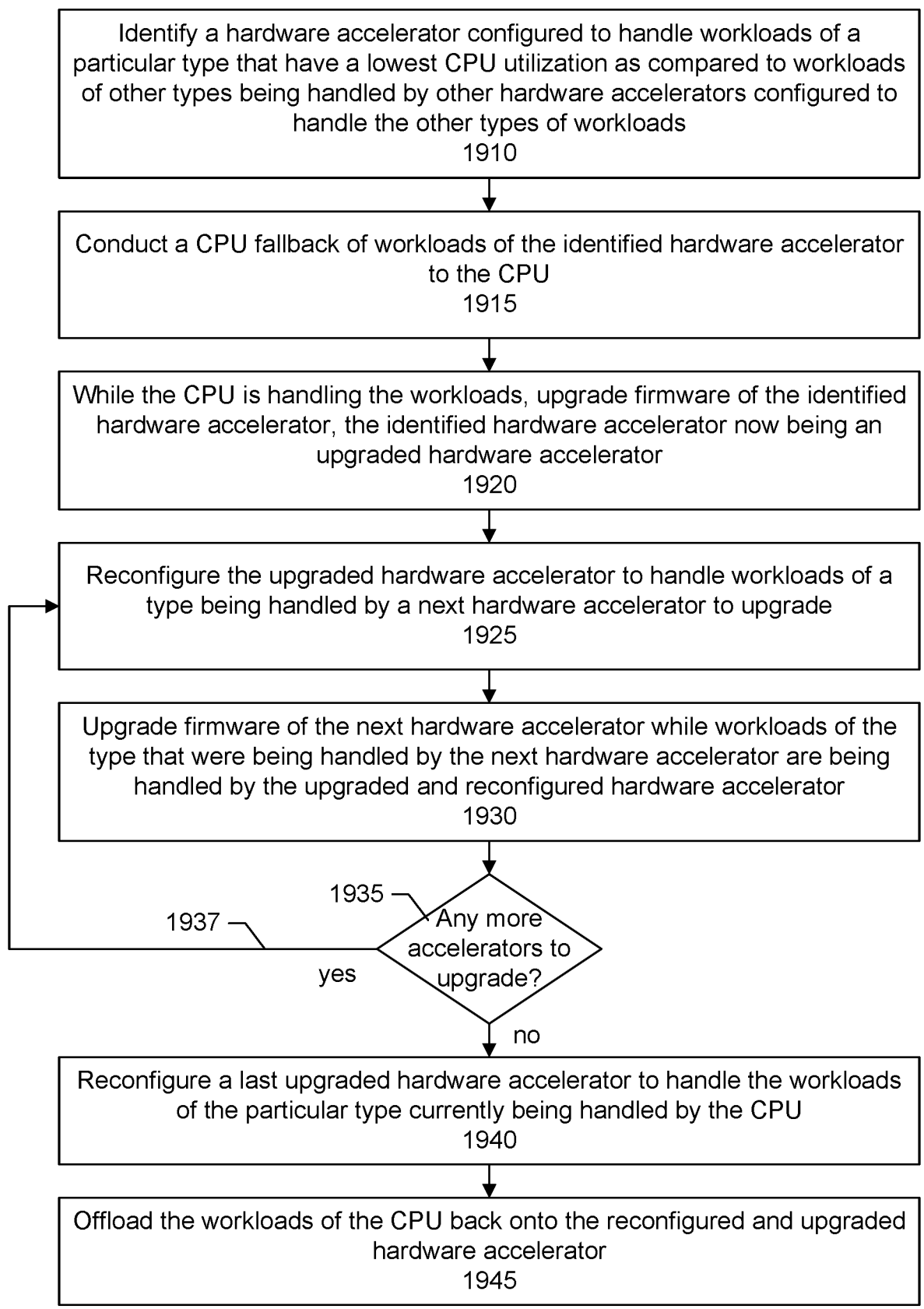
FIG. 19 shows an overall flow for upgrading firmware of an asymmetric hardware accelerator system, according to one or more embodiments.

FIG. 19 shows an overall flow of a process for conducting a firmware upgrade of an asymmetric hardware accelerator system according to one or more embodiments. In a step 1910, a hardware accelerator configured to handle workloads of a particular type that have a lowest CPU utilization as compared to workloads of other types being handled by other hardware accelerators configured to handle the other types of workloads is identified.

Figure 20:
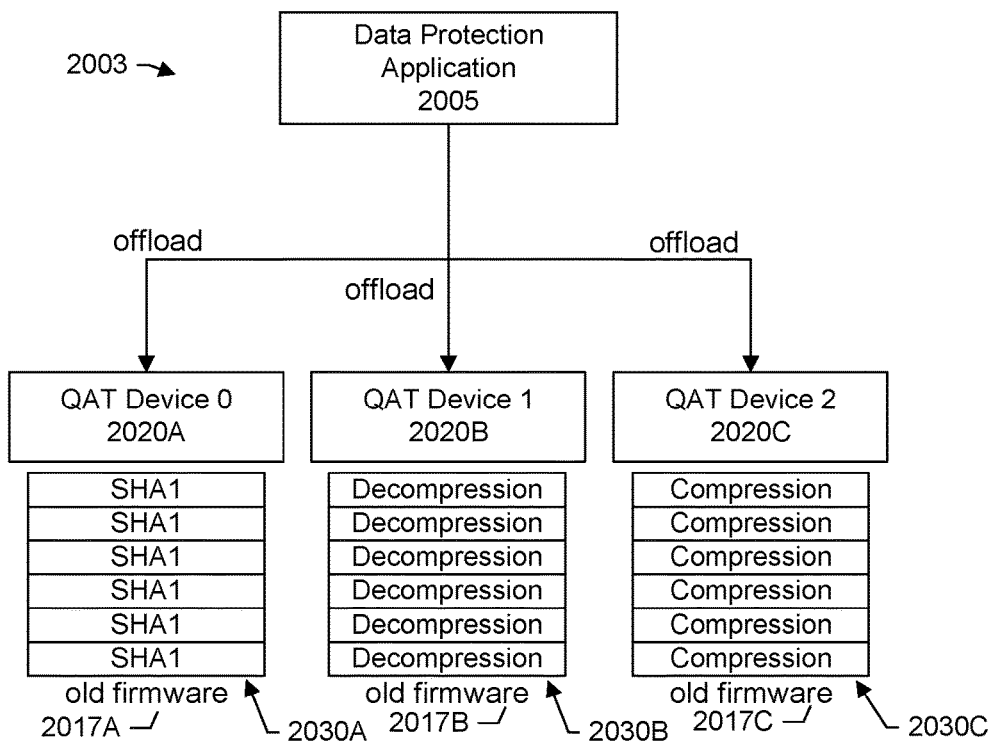
FIG. 20 shows an example of workloads offloaded to an asymmetric hardware accelerator system, according to one or more embodiments.

FIG. 20 shows an example of a first or initial state of an asymmetric hardware accelerator system 2003 having a data protection application 2005 where each hardware accelerator 2020A-C includes old firmware 2017A-C, respectively. Because QAT device 0 is providing hash computation 2030A (e.g., SHA1 service—the most CPU cost effective workload as compared to other types of workloads 2030B,C being processed by other devices), QAT device 0 is identified to be initially upgraded using CPU fallback.

Referring back now to FIG. 19, in a step 1915, a CPU fallback is conducted of workloads of the identified hardware accelerator to upgrade. In a step 1920, while the CPU is handling or processing the workloads, firmware of the identified hardware accelerator is upgraded, the identified hardware accelerator upon completion of the firmware upgrade now being an upgraded hardware accelerator.

Figure 21:
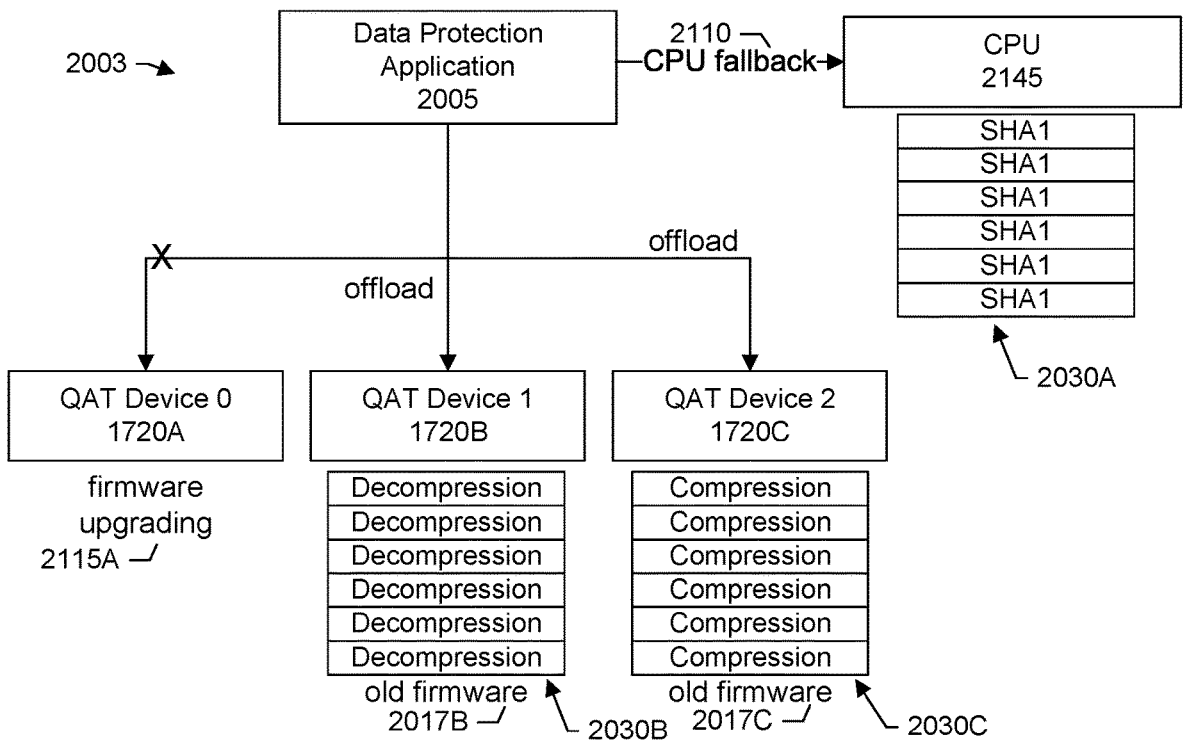
FIG. 21 shows an example of a CPU fallback when upgrading firmware of an asymmetric hardware accelerator system, according to one or more embodiments.

For example, FIG. 21 shows an example of a second state, after the first state, of the asymmetric hardware accelerator system shown in FIG. 20, illustrating a CPU fallback 2110 having been triggered (step 1915) and a firmware upgrade 2115A of the identified hardware accelerator (QAT device 0) while a CPU 2145 is handling or processing the low CPU utilization workloads 2030A of the identified initial hardware accelerator.

In an embodiment, after upgrading, QAT device 0 (e.g., upgraded device) is reconfigured to provide the service being provided by QAT device 1 (e.g., next device to upgrade). Workloads of QAT device 1 are redirected to the reconfigured (and upgraded) QAT device 0. QAT device 1 is then upgraded. In an embodiment, the reconfiguration of a hardware accelerator from a first configuration to a second configuration, different from the first configuration, may be performed during runtime. The reconfiguration may include changing or modifying a configuration file of the hardware accelerator for a specific service or type of workload. Upon the reconfiguration, the hardware accelerator may be restarted in order to reload the changed configuration file and the second configuration to be recognized.

More particularly, referring back now to FIG. 19, in a step 1925, upon completion of the upgrade, the upgraded hardware accelerator is reconfigured to handle or process workloads of a type being handled by a next hardware accelerator to upgrade. In a step 1930, firmware of the next hardware accelerator is upgraded while workloads of the type that were being handled by the next hardware accelerator are being handled by the upgraded and reconfigured hardware accelerator.

Figure 22:
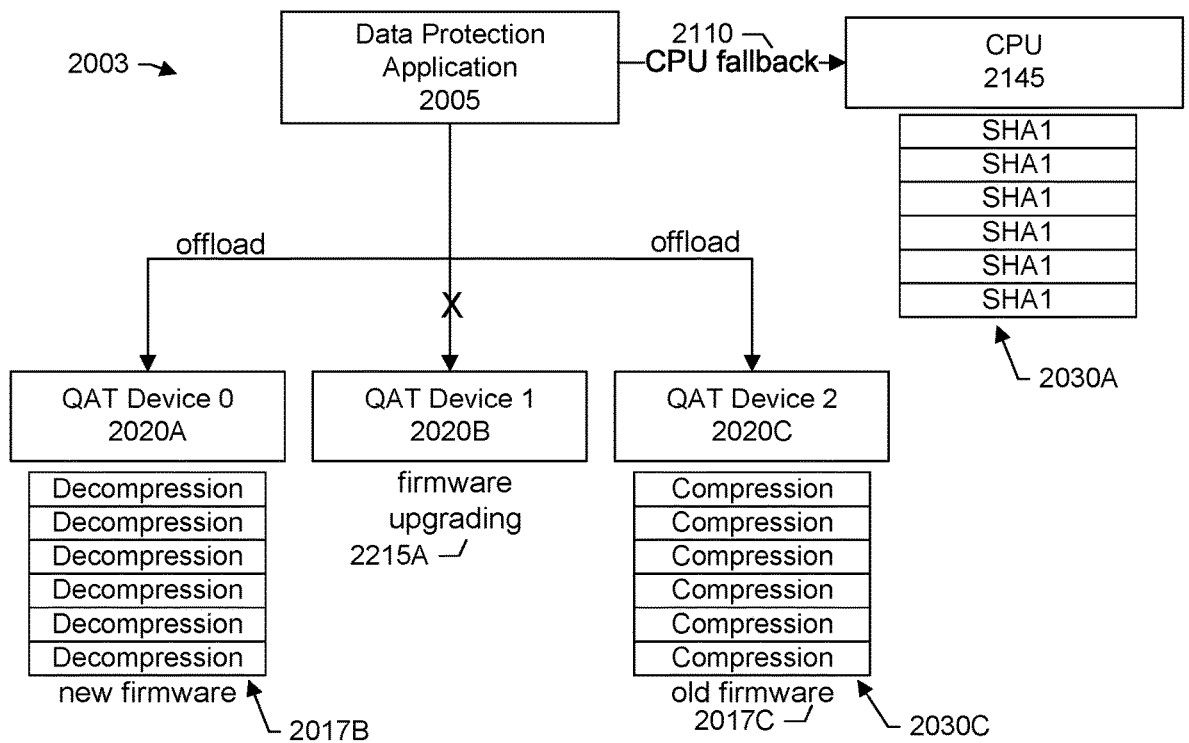
FIG. 22 shows an example of upgrading firmware of an asymmetric hardware accelerator system, according to one or more embodiments.

FIG. 22 shows an example of a third state, after the second state, of the asymmetric hardware accelerator system shown in FIG. 20. Upgraded hardware accelerator QAT device 0 has been reconfigured from handling workloads of the first type (e.g., hash computation) to handling workloads of second type (e.g., decompression) being handled by a next hardware accelerator to upgrade (e.g., QAT device 1)—step 1925, FIG. 19. Firmware of the next hardware accelerator to upgrade (e.g., QAT device 1) is upgraded 2215A while workloads of the second type (e.g., decompression) 2017B that were being handled by QAT device 1 are directed to upgraded and reconfigured QAT device 0—step 1930, FIG. 19. The CPU fallback is maintained with the CPU continuing to process low CPU utilization workloads 2030A.

The process is then repeated for any remaining hardware accelerator devices (e.g., QAT device 2.)

More particularly, referring back now to FIG. 19, in a step 1935, a determination is made as to whether there are any more hardware accelerators to upgrade. If so, the reconfiguring of the upgraded hardware accelerator (step 1925) and upgrade process (step 1930) repeats 1937.

Figure 23:
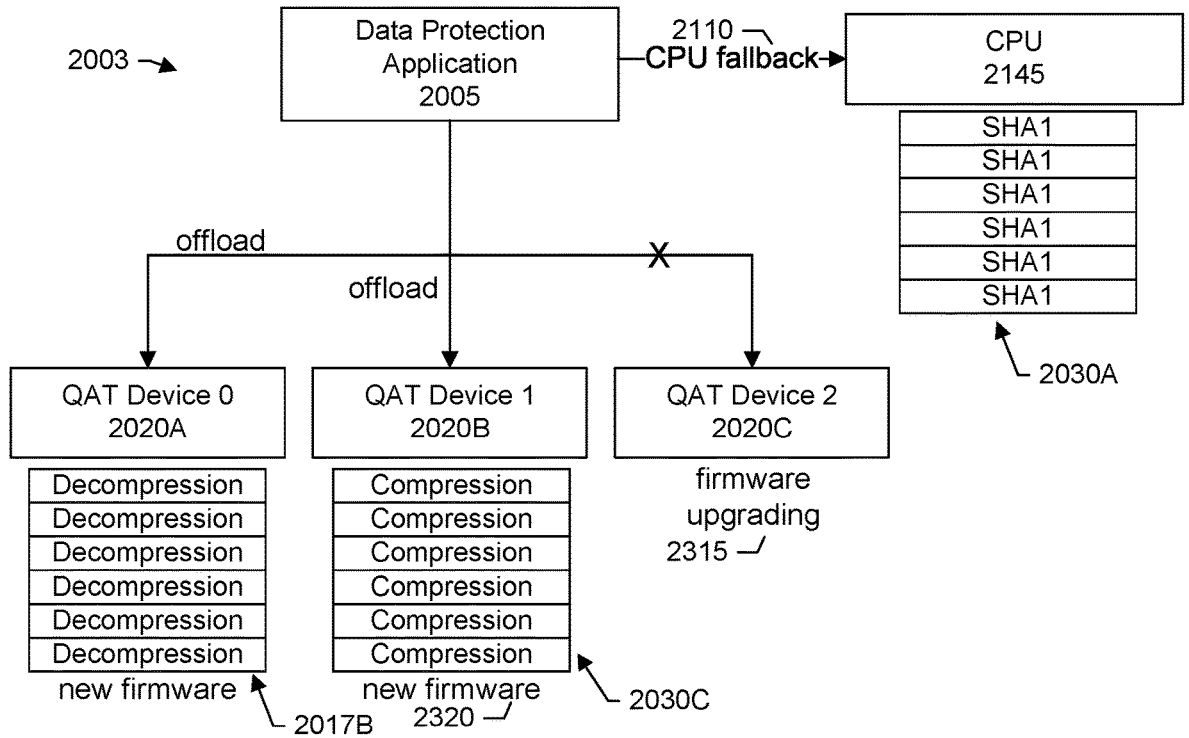
FIG. 23 shows an example of upgrading firmware of another hardware accelerator of an asymmetric hardware accelerator system, according to one or more embodiments.

FIG. 23 shows an example of a fourth state, after the third state, of the asymmetric hardware accelerator system shown in FIG. 20. As shown in the example of FIG. 23, QAT device 1 has now been upgraded with new firmware 2320 and there remains another hardware accelerator to upgrade (e.g., QAT device 2). In an embodiment, a last or most recent hardware accelerator to be upgraded is reconfigured to handle workloads of a type being handled by a next hardware accelerator to upgrade. Thus, in the example shown in FIG. 23, QAT device 1 has been reconfigured to handle workloads of the type that were being handled by QAT device 2. Workloads 2030C of the type that were being handled by QAT device 2 are redirected to QAT device 1 while firmware is being upgraded 2315 on QAT device 2. The CPU fallback is maintained with the CPU continuing to process low CPU utilization workloads 2030A.

Upon completion of upgrading QAT device 2, QAT device 2 is reconfigured to process or handle the low CPU utilization fallback workloads (e.g., SHA1 service) being handled by the CPU and the workloads are offloaded from the CPU back to the upgraded and reconfigured QAT device 2.

More particularly, referring back now to FIG. 19, upon all hardware accelerators being upgraded, in a step 1940, a last upgraded hardware accelerator is reconfigured to handle the workloads of the type currently being handled by the CPU from the CPU fallback. In a step 1945, the workloads of the CPU are offloaded back onto the reconfigured and upgraded hardware accelerator.

Figure 24:
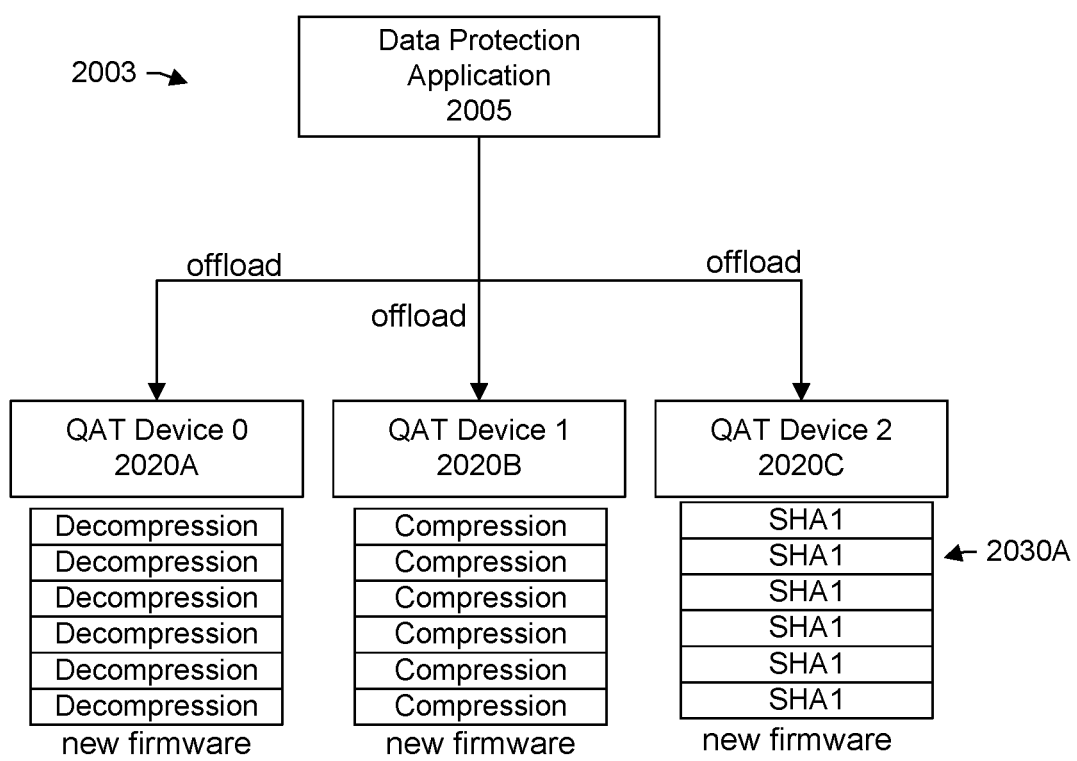
FIG. 24 shows an example of all hardware accelerators of an asymmetric hardware accelerator system having been upgraded, according to one or more embodiments.

FIG. 24 shows an example of a fifth state, after the fourth state, of the asymmetric hardware accelerator system shown in FIG. 20. As shown in the example, of FIG. 24, a last upgraded hardware accelerator (e.g., QAT device 2 2020C) has been reconfigured to handle the low CPU utilization workloads 2030A (e.g., hash computation or SHA1 workloads) that were being handled by the CPU from the CPU fallback, step 1940, FIG. 19. The low CPU utilization workloads 2030A (e.g., hash computation or SHA1 workloads) have been offloaded from the CPU and back onto the reconfigured and upgraded hardware accelerator, e.g., QAT device 2.

In an embodiment, the CPU fallback after a rebalancing may be triggered when one or more hardware accelerators has reached 100 percent utilization. In a symmetric hardware accelerator system, CPU fallback may be triggered when, for example, at least the initially selected hardware accelerator for firmware upgrade has reached 100 percent utilization after a rebalancing.

Hardware accelerator utilization may be obtained by, for example, an agent or other program installed on a hardware accelerator that reports on its current utilization or load to the data protection application. Instead or additionally, the data protection application may track a listing or queue of pending workloads routed to a hardware accelerator. Instead or additionally, the data protection application may track response times from a hardware accelerator to determine when the hardware accelerator has reached 100 percent utilization. There can be a threshold response time. When the response time of hardware accelerator has exceeded the threshold response time, a determination may be made that the hardware accelerator has reached 100 percent utilization.

In an embodiment, systems and techniques are provided to minimize or mitigate the performance impact of QAT non-disruptive firmware upgrade. In an embodiment, there is an adaptive QAT workload rebalance method based on CPU cost-effectiveness. In an embodiment, there is a dynamic QAT device re-configuration method based on CPU cost-effectiveness.

In an embodiment, there is a method for upgrading firmware of a symmetric hardware accelerator system coupled to a central processing unit (CPU) comprising: selecting an initial hardware accelerator to upgrade, the initial and other hardware accelerators handling workloads that have been balanced across the hardware accelerators; rebalancing the workloads by directing workloads having low CPU utilization to the initial hardware accelerator; conducting a CPU fallback of the workloads of the initial hardware accelerator to the CPU; and while the CPU is handling the workloads, upgrading firmware of the initial hardware accelerator, the initial hardware accelerator now being an upgraded hardware accelerator.

The method may include redirecting workloads of a next hardware accelerator to upgrade to the upgraded hardware accelerator; and upgrading firmware of the next hardware accelerator. The method may include repeating the redirecting workloads and upgrading firmware until all hardware accelerators have been upgraded; and upon all hardware accelerators having been upgraded, offloading the workloads of the CPU back onto one or more hardware accelerators that have been upgraded. In an embodiment, the hardware accelerators comprise QuickAssist Technology (QAT) compatible accelerators.

In an embodiment, at an initial state of the symmetric hardware accelerator system before the upgrading of the firmware, each hardware accelerator of the symmetric hardware accelerator system is configured to handle workloads of different types.

In an embodiment, the rebalancing the workloads comprises: receiving a request to process a first workload of a first type; directing the first workload to the initial hardware accelerator; receiving a request to process a second workload of a second type; directing the second workload to a hardware accelerator other than the initial hardware accelerator, wherein an amount of CPU utilization of the first type of workload is less than an amount of CPU utilization of the second type of workload.

In an embodiment, the method includes during the upgrading the firmware, receiving a request to process a first workload of a first type; directing the first workload to the CPU; after the upgrading the firmware, receiving a request to process a second workload of the first type; and directing the second workload to a hardware accelerator.

In another embodiment, there is a system comprising: a processor; and memory configured to store one or more sequences of instructions which, when executed by the processor, cause the processor to carry out the steps of: selecting an initial hardware accelerator to upgrade, the initial and other hardware accelerators handling workloads that have been balanced across the hardware accelerators; rebalancing the workloads by directing workloads having low CPU utilization to the initial hardware accelerator; conducting a CPU fallback of the workloads of the initial hardware accelerator to a central processing unit (CPU); and while the CPU is handling the workloads, upgrading firmware of the initial hardware accelerator, the initial hardware accelerator now being an upgraded hardware accelerator.

In another embodiment, there is a computer program product, comprising a non-transitory computer-readable medium having a computer-readable program code embodied therein, the computer-readable program code adapted to be executed by one or more processors to implement a method for upgrading firmware of a symmetric hardware accelerator system coupled to a central processing unit (CPU), the method comprising: selecting an initial hardware accelerator to upgrade, the initial and other hardware accelerators handling workloads that have been balanced across the hardware accelerators; rebalancing the workloads by directing workloads having low CPU utilization to the initial hardware accelerator; conducting a CPU fallback of the workloads of the initial hardware accelerator to the CPU; and while the CPU is handling the workloads, upgrading firmware of the initial hardware accelerator, the initial hardware accelerator now being an upgraded hardware accelerator.

In an embodiment, there is a method for upgrading firmware of an asymmetric hardware accelerator system coupled to a central processing unit (CPU) comprising: identifying a hardware accelerator configured to handle workloads of a particular type that have a lowest CPU utilization as compared to workloads of other types being handled by other hardware accelerators configured to handle the other types of workloads; conducting a CPU fallback of workloads of the identified hardware accelerator to the CPU; and while the CPU is handling the workloads, upgrading firmware of the identified hardware accelerator, the identified hardware accelerator now being an upgraded hardware accelerator.

The method may include reconfiguring the upgraded hardware accelerator to handle workloads of a type being handled by a next hardware accelerator to upgrade; and upgrading firmware of the next hardware accelerator while workloads of the type that were being handled by the next hardware accelerator are being handled by the upgraded and reconfigured hardware accelerator.

In an embodiment, the method includes repeating the reconfiguring and upgrading until all hardware accelerators have been upgraded; upon all hardware accelerators having been upgraded, reconfiguring a last upgraded hardware accelerator to handle the workloads of the particular type currently being handled by the CPU, and offloading the workloads of the particular type from the CPU back to the last upgraded hardware accelerator. In an embodiment, the hardware accelerators comprise QuickAssist Technology (QAT) compatible accelerators.

In an embodiment, at an initial state of the asymmetric hardware accelerator system before the upgrading of the firmware, each hardware accelerator of the asymmetric hardware accelerator system is configured to handle workloads of a single type.

The method may include during the upgrading the firmware, receiving a request to process a first workload of a first type; directing the first workload to the CPU; after the upgrading the firmware, receiving a request to process a second workload of the first type; and directing the second workload to a last hardware accelerator that was upgraded.

In an embodiment, there is a system comprising: a processor; and memory configured to store one or more sequences of instructions which, when executed by the processor, cause the processor to carry out the steps of: identifying a hardware accelerator configured to handle workloads of a particular type that have a lowest CPU utilization as compared to workloads of other types being handled by other hardware accelerators configured to handle the other types of workloads; conducting a CPU fallback of workloads of the identified hardware accelerator to a central processing unit (CPU); and while the CPU is handling the workloads, upgrading firmware of the identified hardware accelerator, the identified hardware accelerator now being an upgraded hardware accelerator.

In an embodiment, there is a computer program product, comprising a non-transitory computer-readable medium having a computer-readable program code embodied therein, the computer-readable program code adapted to be executed by one or more processors to implement a method for upgrading firmware of an asymmetric hardware accelerator system coupled to a central processing unit (CPU), the method comprising: identifying a hardware accelerator configured to handle workloads of a particular type that have a lowest CPU utilization as compared to workloads of other types being handled by other hardware accelerators configured to handle the other types of workloads; conducting a CPU fallback of workloads of the identified hardware accelerator to the CPU; and while the CPU is handling the workloads, upgrading firmware of the identified hardware accelerator, the identified hardware accelerator now being an upgraded hardware accelerator.

Figure 25:
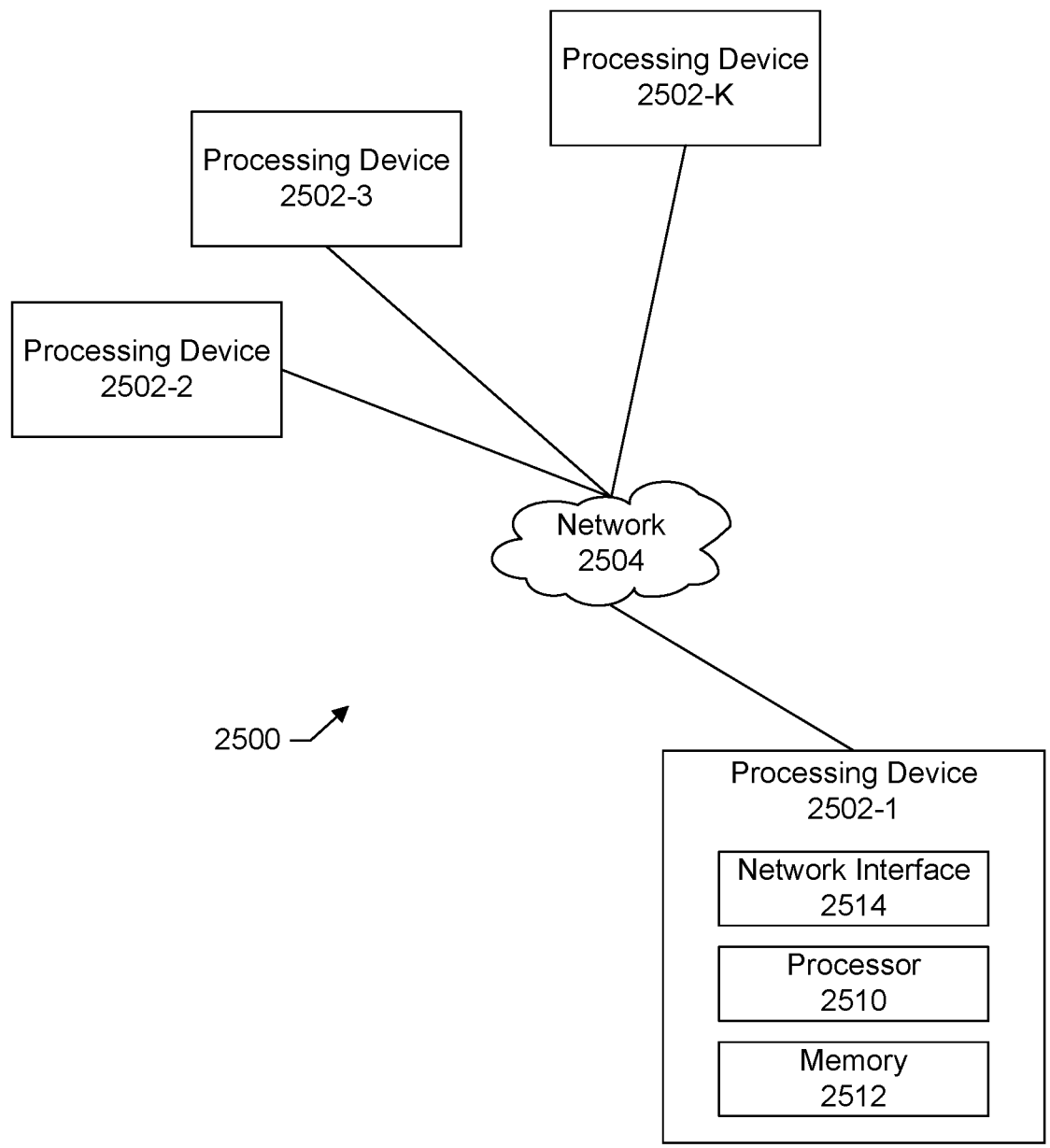
FIG. 25 shows another block diagram of a processing platform that may be utilized to implement at least a portion of an information processing system, according to one or more embodiments.

FIG. 25 shows an example of a processing platform 2500. The processing platform 2500 in this embodiment comprises a portion of system 100 and includes a plurality of processing devices, denoted 2502-1, 2502-2, 2502-3, . . . 2502-K, which communicate with one another over a network 2504.

The network 2504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 2502-1 in the processing platform 2500 comprises a processor 2510 coupled to a memory 2512.

The processor 2510 may comprise a microprocessor, a microcontroller, an application-specific integrated circuit (ASIC), a field-programmable gate array (FPGA) or other type of processing circuitry, as well as portions or combinations of such circuitry elements.

The memory 2512 may comprise random access memory (RAM), read-only memory (ROM) or other types of memory, in any combination. The memory 2512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 2502-1 is network interface circuitry 2514, which is used to interface the processing device with the network 2504 and other system components, and may comprise conventional transceivers.

The other processing devices 2502 of the processing platform 2500 are assumed to be configured in a manner similar to that shown for processing device 2502-1 in the figure.

Again, the particular processing platform 2500 shown in the figure is presented by way of example only, and system 2500 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 26:
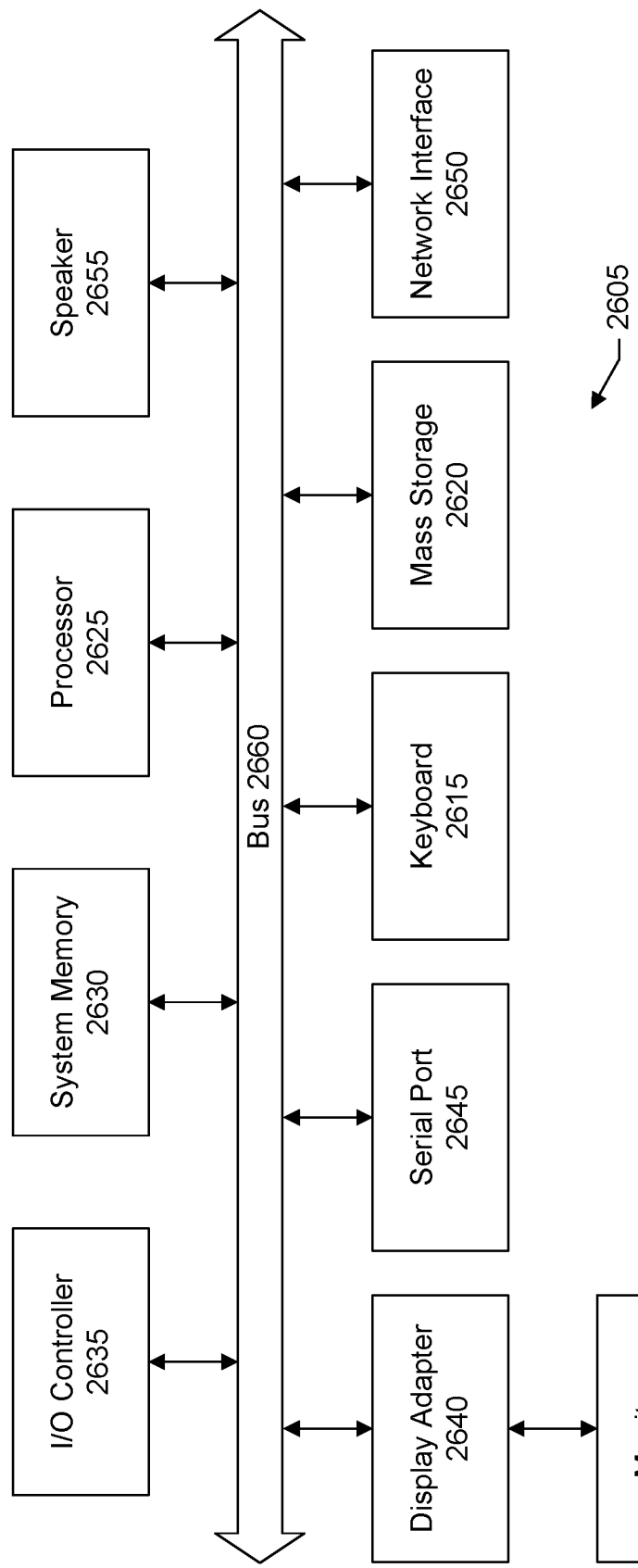
FIG. 26 shows a block diagram of a computer system suitable for use with the information processing system, according to one or more embodiments.

FIG. 26 shows a system block diagram of a computer system 2605 used to execute the software of the present system described herein. The computer system includes a monitor 2607, keyboard 2615, and mass storage devices 2620. Computer system 2605 further includes subsystems such as central processor 2625, system memory 2630, input/output (I/O) controller 2635, display adapter 2640, serial or universal serial bus (USB) port 2645, network interface 2650, and speaker 2655. The system may also be used with computer systems with additional or fewer subsystems. For example, a computer system could include more than one processor 2625 (i.e., a multiprocessor system) or a system may include a cache memory.

Arrows such as 2660 represent the system bus architecture of computer system 2605. However, these arrows are illustrative of any interconnection scheme serving to link the subsystems. For example, speaker 2655 could be connected to the other subsystems through a port or have an internal direct connection to central processor 2625. The processor may include multiple processors or a multicore processor, which may permit parallel processing of information. Computer system 2605 shown in FIG. 26 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows® family of systems (e.g., Windows Server), Linux, Mac OS X®, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

What is claimed is:

1. A method for upgrading firmware of a symmetric hardware accelerator system coupled to a central processing unit (CPU) comprising:
   selecting an initial hardware accelerator to upgrade, the initial and other hardware accelerators handling workloads that have been balanced across the hardware accelerators;
   rebalancing the workloads by directing workloads having low CPU utilization to the initial hardware accelerator;
   conducting a CPU fallback of the workloads of the initial hardware accelerator to the CPU; and
   while the CPU is handling the workloads, upgrading firmware of the initial hardware accelerator, the initial hardware accelerator now being an upgraded hardware accelerator, wherein the rebalancing the workloads comprises:
   receiving a request to process a first workload of a first type;
   directing the first workload to the initial hardware accelerator;
   receiving a request to process a second workload of a second type; and
   directing the second workload to a hardware accelerator other than the initial hardware accelerator, wherein an amount of CPU utilization of the first type of workload is less than an amount of CPU utilization of the second type of workload.

2. The method of claim 1 further comprising:
   redirecting workloads of a next hardware accelerator to upgrade to the upgraded hardware accelerator; and
   upgrading firmware of the next hardware accelerator.

3. The method of claim 2 further comprising:
   repeating the redirecting workloads and upgrading firmware until all hardware accelerators have been upgraded; and
   upon all hardware accelerators having been upgraded, offloading the workloads of the CPU back onto one or more hardware accelerators that have been upgraded.

4. The method of claim 1 wherein the hardware accelerators comprise QuickAssist Technology (QAT) compatible accelerators.

5. The method of claim 1 wherein at an initial state of the symmetric hardware accelerator system before the upgrading of the firmware, each hardware accelerator of the symmetric hardware accelerator system is configured to handle workloads of different types.

6. The method of claim 1 further comprising:
during the upgrading the firmware, receiving a request to process a third workload of a third type;
directing the third workload to the CPU;
after the upgrading the firmware, receiving a request to process a second fourth workload of the third type; and
directing the fourth workload to a hardware accelerator.

7. A system comprising: a processor; and memory configured to store one or more sequences of instructions which, when executed by the processor, cause the processor to carry out the steps of:
selecting an initial hardware accelerator to upgrade, the initial and other hardware accelerators handling workloads that have been balanced across the hardware accelerators;
rebalancing the workloads by directing workloads having low CPU utilization to the initial hardware accelerator;
conducting a CPU fallback of the workloads of the initial hardware accelerator to a central processing unit (CPU);
while the CPU is handling the workloads, upgrading firmware of the initial hardware accelerator, the initial hardware accelerator now being an upgraded hardware accelerator;
during the upgrading the firmware, receiving a request to process a first workload of a first type;
directing the first workload to the CPU;
after the upgrading the firmware, receiving a request to process a second workload of the first type; and
directing the second workload to a hardware accelerator.

8. The system of claim 7 wherein the processor further carries out the steps of:
redirecting workloads of a next hardware accelerator to upgrade to the upgraded hardware accelerator; and
upgrading firmware of the next hardware accelerator.

9. The system of claim 8 wherein the processor further carries out the steps of:
repeating the redirecting workloads and upgrading firmware until all hardware accelerators have been upgraded; and
upon all hardware accelerators having been upgraded, offloading the workloads of the CPU back onto one or more hardware accelerators that have been upgraded.

10. The system of claim 7 wherein the hardware accelerators comprise QuickAssist Technology (QAT) compatible accelerators.

11. The system of claim 7 wherein at an initial state of the symmetric hardware accelerator system before the upgrading of the firmware, each hardware accelerator of the symmetric hardware accelerator system is configured to handle workloads of different types.

12. The system of claim 7 wherein the rebalancing the workloads comprises:
receiving a request to process a third workload of a second type;
directing the third workload to the initial hardware accelerator;
receiving a request to process a fourth workload of a third type; and
directing the fourth workload to a hardware accelerator other than the initial hardware accelerator, wherein an amount of CPU utilization of the second type of workload is less than an amount of CPU utilization of the third type of workload.

13. A computer program product, comprising a non-transitory computer-readable medium having a computer-readable program code embodied therein, the computer-readable program code adapted to be executed by one or more processors to implement a method for upgrading firmware of a symmetric hardware accelerator system coupled to a central processing unit (CPU), the method comprising:
selecting an initial hardware accelerator to upgrade, the initial and other hardware accelerators handling workloads that have been balanced across the hardware accelerators;
rebalancing the workloads by directing workloads having low CPU utilization to the initial hardware accelerator;
conducting a CPU fallback of the workloads of the initial hardware accelerator to the CPU;
while the CPU is handling the workloads, upgrading firmware of the initial hardware accelerator, the initial hardware accelerator now being an upgraded hardware accelerator;
during the upgrading the firmware, receiving a request to process a first workload of a first type;
directing the first workload to the CPU;
after the upgrading the firmware, receiving a request to process a second workload of the first type; and
directing the second workload to a hardware accelerator.

14. The computer program produce of claim 13 wherein the method further comprises:
redirecting workloads of a next hardware accelerator to upgrade to the upgraded hardware accelerator; and
upgrading firmware of the next hardware accelerator.

15. The computer program product of claim 14 wherein the method further comprises:
repeating the redirecting workloads and upgrading firmware until all hardware accelerators have been upgraded; and
upon all hardware accelerators having been upgraded, offloading the workloads of the CPU back onto one or more hardware accelerators that have been upgraded.

16. The computer program product of claim 13 wherein at an initial state of the symmetric hardware accelerator system before the upgrading of the firmware, each hardware accelerator of the symmetric hardware accelerator system is configured to handle workloads of different types.

17. The computer program product of claim 13 wherein the rebalancing the workloads comprises:
receiving a request to process a third workload of a second type;
directing the third workload to the initial hardware accelerator;
receiving a request to process a fourth workload of a third type; and
directing the fourth workload to a hardware accelerator other than the initial hardware accelerator, wherein an amount of CPU utilization of the second type of workload is less than an amount of CPU utilization of the third type of workload.

* * * * *